US009507186B2

(12) United States Patent
Kuroda

(10) Patent No.: US 9,507,186 B2
(45) Date of Patent: Nov. 29, 2016

(54) IMAGE DISPLAY UNIT WITH CONTROLLED ELECTRODE SETS

(75) Inventor: Tomonori Kuroda, Saitama (JP)

(73) Assignee: NEC CORPORATION, Tokyo (JP)

(*) Notice: Subject to any disclaimer, the term of this patent is extended or adjusted under 35 U.S.C. 154(b) by 326 days.

(21) Appl. No.: 13/985,376

(22) PCT Filed: Nov. 9, 2011

(86) PCT No.: PCT/JP2011/006272
§ 371 (c)(1),
(2), (4) Date: Aug. 14, 2013

(87) PCT Pub. No.: WO2012/120575
PCT Pub. Date: Sep. 13, 2012

(65) Prior Publication Data
US 2013/0335648 A1  Dec. 19, 2013

(30) Foreign Application Priority Data

Mar. 4, 2011 (JP) ................................. 2011-048131

(51) Int. Cl.
| *G02F 1/133* | (2006.01) |
| *G09G 3/00* | (2006.01) |
| *G02B 27/22* | (2006.01) |
| *H04N 13/04* | (2006.01) |
| *G02F 1/1343* | (2006.01) |
| *G02F 1/1347* | (2006.01) |

(52) U.S. Cl.
CPC ....... *G02F 1/13306* (2013.01); *G02B 27/2214* (2013.01); *G09G 3/003* (2013.01); *H04N 13/0409* (2013.01); *H04N 13/0454* (2013.01); *H04N 13/0497* (2013.01); *G02F 1/1347* (2013.01); *G02F 1/134336* (2013.01); *H04N 2013/0463* (2013.01)

(58) Field of Classification Search
CPC combination set(s) only.
See application file for complete search history.

(56) References Cited

U.S. PATENT DOCUMENTS

| 8,817,369 B2 | 8/2014 | Daiku |
| 2007/0183015 A1* | 8/2007 | Jacobs ................. G02F 1/1323 359/245 |
| 2008/0137012 A1 | 6/2008 | Louwsma |

(Continued)

FOREIGN PATENT DOCUMENTS

| JP | 2005134678 | 5/2005 |
| JP | 2007-293270 | 11/2007 |

(Continued)

OTHER PUBLICATIONS

Extended European Search Report, dated Oct. 6, 2014, in corresponding European Patent Application No. 11860175.6.

(Continued)

*Primary Examiner* — Lauren Nguyen
(74) *Attorney, Agent, or Firm* — Young & Thompson

(57) ABSTRACT

This image display unit includes an image display panel and a barrier liquid crystal panel. The barrier liquid crystal panel appropriately controls a potential applied to one or the plurality of electrodes forming the scan-side transparent electrode (105) and the common-side transparent electrode (104) according to an operation mode that is specified, changes a slit width and a slit pitch of the slits (100S, and switches a function to one of the three functions of the 2D display function that emits image light for 2D display from the pixels, the 3D display function that emits image light for 3D display from each of pixels for left eye and pixels for right eye of the pixels, and the viewing angle control function that controls a viewing angle of the image light from the pixels.

4 Claims, 19 Drawing Sheets

(56) References Cited

U.S. PATENT DOCUMENTS

| | | | |
|---|---|---|---|
| 2009/0027579 A1* | 1/2009 | Aota et al. ................ | 349/41 |
| 2009/0102990 A1* | 4/2009 | Walton ................ | G02F 1/1323 |
| | | | 349/15 |
| 2010/0302351 A1 | 12/2010 | Yanamoto | |
| 2011/0001894 A1 | 1/2011 | Owaku et al. | |
| 2011/0051239 A1 | 3/2011 | Daiku | |

FOREIGN PATENT DOCUMENTS

| | | |
|---|---|---|
| JP | 2008-545994 | 12/2008 |
| JP | 2010-276965 | 12/2010 |
| JP | 2011-013575 | 1/2011 |
| JP | 2011053277 | 3/2011 |
| KR | 100876671 | 1/2009 |

OTHER PUBLICATIONS

Japanese Office Action, dated Nov. 18, 2014, in corresponding Japanese Patent Application No. 2011-048131, with partial English translation.

International Search Report, PCT/JP2011/006272, Feb. 7, 2012.

\* cited by examiner

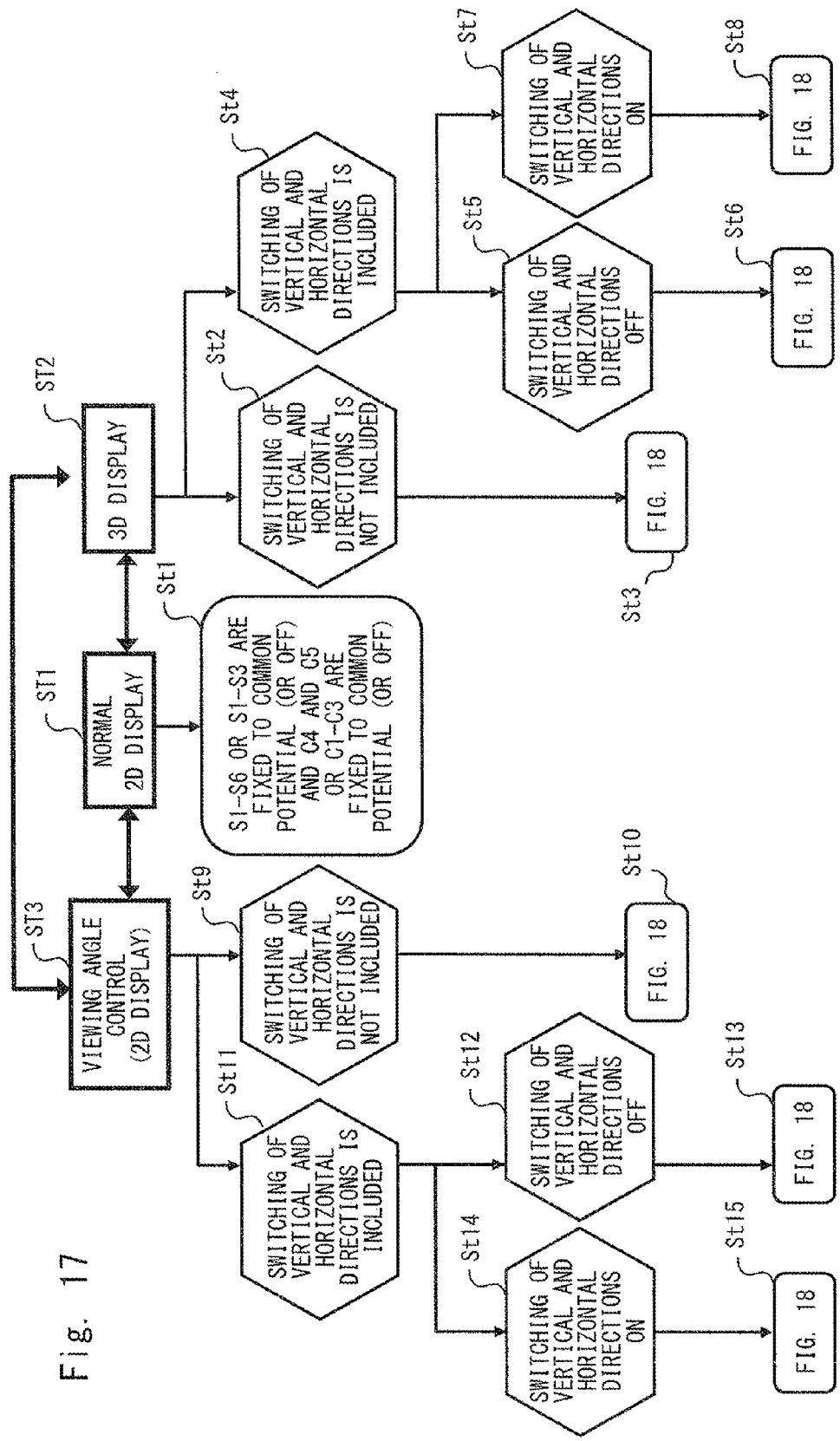

Fig. 18

|  | S1 | S2 | S3 | C1 | C2 | C3 |
|---|---|---|---|---|---|---|
| St3 | APPLY ALTERNATING POTENTIAL | APPLY ALTERNATING POTENTIAL | FIX TO COMMON POTENTIAL | FIX TO COMMON POTENTIAL | FIX TO COMMON POTENTIAL | FIX TO COMMON POTENTIAL |
| St10 | FIX TO COMMON POTENTIAL | APPLY ALTERNATING POTENTIAL | APPLY ALTERNATING POTENTIAL | FIX TO COMMON POTENTIAL | FIX TO COMMON POTENTIAL | FIX TO COMMON POTENTIAL |

|  | S1 | S2 | S3 | S4 | S5 | S6 | C1 | C2 | C3 | C4 | C5 |
|---|---|---|---|---|---|---|---|---|---|---|---|
| St6 | APPLY ALTERNATING POTENTIAL | APPLY ALTERNATING POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL |
| St8 | FIX TO COMMON POTENTIAL | FIX TO COMMON POTENTIAL | FIX TO COMMON POTENTIAL | APPLY ALTERNATING POTENTIAL | APPLY ALTERNATING POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL |
| St13 | FIX TO COMMON POTENTIAL | APPLY ALTERNATING POTENTIAL | APPLY ALTERNATING POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL |
| St15 | FIX TO COMMON POTENTIAL | FIX TO COMMON POTENTIAL | FIX TO COMMON POTENTIAL | FIX TO COMMON POTENTIAL | APPLY ALTERNATING POTENTIAL | APPLY ALTERNATING POTENTIAL | FIX TO COMMON POTENTIAL | FIX TO COMMON POTENTIAL | FIX TO COMMON POTENTIAL | FIX TO COMMON POTENTIAL | FIX TO COMMON POTENTIAL |

IMAGE DISPLAY UNIT WITH CONTROLLED ELECTRODE SETS

TECHNICAL FIELD

The present invention relates to an image display unit, an image display control method, and a non-transitory computer readable medium storing an image display control program, and more specifically, to an image display unit, an image display control method, and a non-transitory computer readable medium storing an image display control program including a two dimension (2D) display function, a three dimension (3D) display function, and a viewing angle control function.

BACKGROUND ART

Three dimension (3D) display techniques to display 3D stereoscopic images in an image display unit (display) of a mobile terminal such as a mobile telephone, a personal computer (PC), and a television include, as is well known in the art, a parallax barrier system, a micro lens system, an integral imaging system and the like. Meanwhile, a viewing angle control technique for controlling the viewing angle of the image display unit includes systems of attaching a commercially available louver (louver sheet that cuts oblique light by slits), overlapping liquid crystals having different directivities, applying contrast reduction to visual angle properties of displayed liquid crystals by grayscale adjustment (Patent literatures 1 and 2).

CITATION LIST

Patent Literature

Patent literature 1: Japanese Unexamined Patent Application Publication No. 2007-293270 (pp. 5-14)
Patent literature 2: Published Japanese Translation of PCT International Publication for Patent Application, No. 2008-545994 (pp. 16-24)

SUMMARY OF INVENTION

Technical Problem

Each of the related techniques including the parallax barrier system, the micro lens system, and the integral imaging system that achieve the 3D display function has been established as techniques for achieving 2D/3D switching. However, these related techniques have not been achieved as methods including other functions as well. Further, depending on the applications of the display, there are some cases in which 2D is more convenient or 2D should be used in preference to 3D. Accordingly, with only the 3D display function, the disadvantages are easily raised.

In particular, it is required to assume cases in which mobile terminals such as mobile telephones or notebook personal computers are used in a situation in which there are a large crowd of people (e.g., in trains). However, in such a situation, an e-mail screen displayed on an image display unit (display) of a mobile terminal is frequently peeped at by surrounding people. This often prevents free manipulations of the mobile terminals.

Techniques for solving such problems include applying a technique for controlling the viewing angle to overlap liquid crystals with strong directivity as an image display unit, lowering the display contrast by controlling the grayscale of liquid crystals, attaching a louver (a commercially-available louver sheet including slits formed therein), for example, as described above. However, each of the techniques may cause a further increase in thickness of the image display unit and unguaranteed strength risks. Further, when liquid crystals with wide viewing angle in which grayscale inversion rarely occurs are used, even when the display contrast is lowered by grayscale control, it may often become difficult to greatly change visibility between a front view and an oblique view.

In short, the following problems occur even with the independent implementation of the 3D display technique and the viewing angle control technique as stated above.

The first problem is as follows. First, there are some disadvantages such as reduction in transmittance of the image display unit, an increase in the thickness of the unit and the like depending on the types of structural elements and techniques added to perform switching of 2D/3D display. However, 3D display is not always necessary for all the applications of display and there are some cases in which other effects are prioritized depending on the use conditions. Accordingly, it is more important to increase the effects obtained against such disadvantages.

The second problem is as follows. First, the image display unit using liquid crystals with wide viewing angle originally has a wide viewing angle. Accordingly, when it is tried to prevent viewing from oblique directions by lowering the contrast by grayscale adjustment, it greatly lowers visibility also from a front view. Accordingly, it is impossible to sufficiently obtain the effects of the viewing angle control.

Object of the Present Invention

The present invention has been made in view of the aforementioned circumstances, and aims to provide an image display unit, an image display control method, and an image display control program that include three kinds of functions of a 2D display function, a 3D display function, and a viewing angle control function, and are able to perform flexible switching of these functions.

Solution to Problem

In order to solve the aforementioned problems, the image display unit, the image display control method, and the image display control program according to the present invention mainly employ the following characteristic configurations.

(1) An image display unit according to the present invention is an image display unit at least including: an image display panel that forms pixels to display an image; and a barrier liquid crystal panel that is arranged above the image display panel and forms slits that serve as barriers to shield image light from the pixels of the image display panel, in which the barrier liquid crystal panel forming the slits includes a scan-side transparent electrode and a common-side transparent electrode having sets of electrodes each set formed of an electrode group of one or a plurality of electrodes set to have predetermined one or a plurality of electrode widths corresponding to arrangement intervals of the pixels, the scan-side transparent electrode and the common-side transparent electrode being arranged corresponding to positions of the pixels, and the barrier liquid crystal panel appropriately controls a potential applied to one or the plurality of electrodes forming each of the scan-side transparent electrode and the common-side transparent electrode according to an operation mode that is specified to change a slit width and a slit pitch of the slits formed in the barrier liquid crystal panel, thereby switching to one of three functions of a two dimension (2D) display function that emits image light for 2D display from the pixels of the image display panel as a first mode, a three dimension (3D) display function that emits image light for 3D display from each of pixels for left eye and pixels for right eye of the pixels of the image display panel as a second mode, and a viewing angle control function that controls a viewing angle of the image light from the pixels of the image display panel as a third mode.

(2) An image display control method according to the present invention is an image display control method in an image display unit at least including: an image display panel that forms pixels to display an image; and a barrier liquid crystal panel that is arranged above the image display panel and forms slits that serve as barriers to shield image light from the pixels of the image display panel, in which the barrier liquid crystal panel forming the slits includes a scan-side transparent electrode and a common-side transparent electrode having sets of electrodes each set formed of an electrode group of one or a plurality of electrodes set to have predetermined one or a plurality of electrode widths corresponding to arrangement intervals of the pixels, the scan-side transparent electrode and the common-side transparent electrode being arranged corresponding to positions of the pixels, and the barrier liquid crystal panel appropriately controls a potential applied to one or the plurality of electrodes forming each of the scan-side transparent electrode and the common-side transparent electrode according to an operation mode that is specified to change a slit width and a slit pitch of the slits formed in the barrier liquid crystal panel, thereby switching to one of three functions of a two dimension (2D) display function that emits image light for 2D display from the pixels of the image display panel as a first mode, a three dimension (3D) display function that emits image light for 3D display from each of pixels for left eye and pixels for right eye of the pixels of the image display panel as a second mode, and a viewing angle control function that controls a viewing angle of the image light from the pixels of the image display panel as a third mode.

(3) An image display control program according to the present invention executes the image display control method at least described in the above (2) as a program that can be executed by a computer.

Advantageous Effects of Invention

According to the image display unit, the image display control method, and the image display control program according to the present invention, it is possible to achieve the following effects.

The first effect is as follows. First, the electrode structures of the scan-side transparent electrode and the common-side transparent electrode formed in the barrier liquid crystal panel are such that one or a plurality of electrodes are formed as one set. Further, the electrode group of each set is arranged to correspond to the position of each of the pixels formed in the image display panel, and the method of controlling the electrode group of each set is differentiated according to the operation mode. Accordingly, it is possible to easily switch the mode to any one of the three operation modes of the first mode for 2D display, the second mode for 3D display, and the third mode for viewing angle control.

The second effect is as follows. That is, for example, when they are applied as the image display unit of the parallax barrier system, a barrier liquid crystal panel is added to switch 2D and 3D, which increases the thickness. However, there is no need to increase further thickness to add the viewing angle control function, and the structural risks such as strength as the image display module or the image display apparatus can also be reduced.

The third effect is as follows. That is, for example, when they are applied as the image display unit of the parallax barrier system, it is possible to apply the process for manufacturing the parallax barrier panel, i.e., the barrier liquid crystal panel without greatly changing the conventional technique to add the function for 3D display and the function for viewing angle control to the normal function for 2D display.

The fourth effect is as follows. That is, also in a front view when the 2D display or the viewing angle control is achieved, it is possible to achieve the brightness equal to that in the 3D display depending on the conditions of forming the slits formed in the barrier liquid crystal panel.

BRIEF DESCRIPTION OF DRAWINGS

FIG. 17 is a flowchart for describing one example of an operation of the image display unit including three operation modes of a normal first mode for 2D display, a second mode for 3D display, and a third mode for viewing angle control as one example of an image display control method according to the present invention; and FIG. 18 is a diagram showing control contents of potentials in each step in FIG. 17.

DESCRIPTION OF EMBODIMENTS

Figure 1:
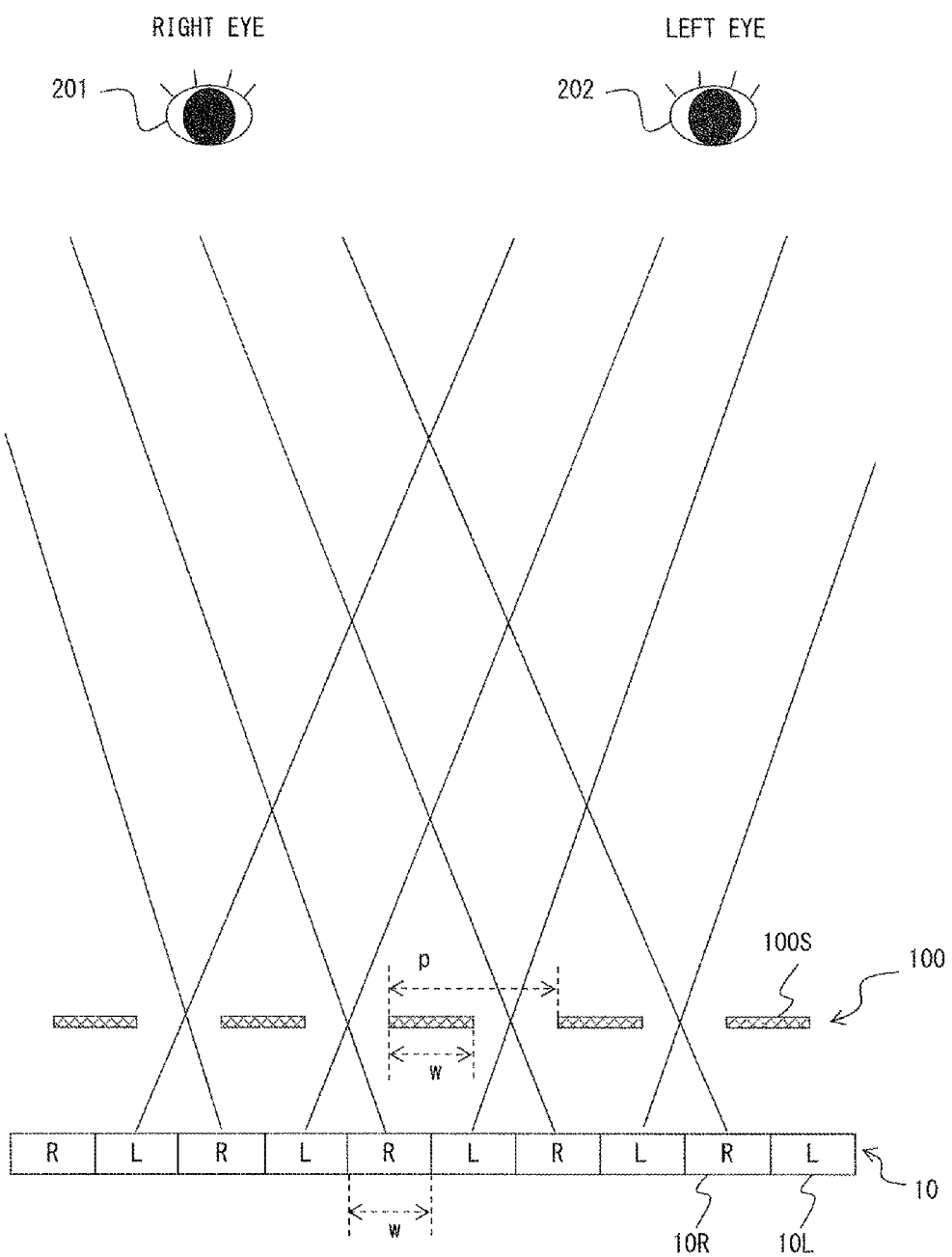
FIG. 1 is an explanatory view schematically showing the principle of 3D display in an image display unit of a parallax barrier system.

Hereinafter, with reference to the accompanying drawings, a preferred exemplary embodiment of an image display unit, an image display control method, and an image display control program according to the present invention will be described. In the following description, the image display unit and the image display control method according to the present invention will be described. However, as a matter of course, such an image display control method may be executed as an image display control program that can be executed by a computer, or the image display control program may be recorded in a storage medium that can be read out by a computer.

(Features of the Present Invention)

Prior to the description of the exemplary embodiment of the present invention, the outline of the features of the present invention will be described first. The present invention provides an image display unit, an image display control method, and an image display control program capable of achieving three functions of a 2D display function, a 3D display function, and a viewing angle control function. The present invention includes a barrier liquid crystal panel in which a scan-side transparent electrode and a common-side transparent electrode can be formed, the scan-side transparent electrode and the common-side transparent electrode having electrode structures specific to the present invention and having sets of electrodes, each set including one or a plurality of electrodes whose electrode width is predetermined in consideration of arrangement intervals of pixels, and a method of controlling the electrodes is appropriately switched according to the operations mode to be set, thereby achieving the effect of two functions of the 3D display function and the viewing angle control function in addition to the 2D display function by only ene component of the barrier liquid crystal panel. In particular, the main feature of the present invention is that it is possible to instantaneously switch a mode to any appropriate operation mode of a first mode for normal 2D display, a second mode for 3D display, and a third mode for viewing angle control according to the environment in which a personal computer or a mobile telephone is used and the display performance that is necessary.

More specifically, the present invention has the main feature as follows. When the optical path is designed to allow images having a parallax in right and left eyes to input in order to achieve 3D display, a design for narrowing the viewing angle is also incorporated into the image display unit, thereby enabling switching to the viewing angle control function as well as switching from the 2D display function which is the normal state to the 3D display function. Specifically, according to the present invention, in the image display unit of the parallax barrier system, for example, a slit width, a slit pitch or the like of the parallax barrier is changed by the electrode structure of the barrier liquid crystal panel forming the parallax barrier panel and the switching control method of the applied voltage to control the light amount/angle at which the image light emitted from pixels of the image display panel transmits between slits, thereby being able to arbitrarily switch the 2D display function, the 3D display function, and the viewing angle control function depending on the situations.

To be more specific, the present invention at least includes an image display panel that forms pixels to display an image; and a barrier liquid crystal panel that is arranged above the image display panel and forms slits that serve as barriers to shield image light from the pixels of the image display panel, and the barrier liquid crystal panel forming the slits includes a scan-side transparent electrode and a common-side transparent electrode having sets of electrodes each set formed of an electrode group of one or a plurality of electrodes set to have predetermined one or a plurality of electrode widths corresponding to arrangement intervals of the pixels, the scan-side transparent electrode and the common-side transparent electrode being arranged corresponding to positions of the pixels, and the barrier liquid crystal panel appropriately controls a potential applied to one or the plurality of electrodes forming each of the scan-side transparent electrode and the common-side transparent electrode according to an operation mode that is specified to change a slit width and a slit pitch of the slits formed in the barrier liquid crystal panel, thereby switching to one of three functions of a two dimension (2D) display function that emits image light for 2D display from the pixels of the image display panel as a first mode, a three dimension (3D) display function that emits image light for 3D display from each of pixels for left eye and pixels for right eye of the pixels of the image display panel as a second mode, and a viewing angle control function that controls a viewing angle of the image light from the pixels of the image display panel as a third mode.

In the first mode, each of one or the plurality of electrodes forming each of the scan-side transparent electrode and the common-side transparent electrode is either fixed to a common potential or set to an OFF state, thereby emitting the image light for two dimension (2D) display from the pixels of the image display panel from the barrier liquid crystal panel without forming the slits in the barrier liquid crystal panel. In the second mode, by applying an alternating potential to an electrode predetermined as an electrode for 3D display among the plurality of electrodes forming the scan-side transparent electrode and fixing ene or the plurality of electrodes forming the common-side transparent electrode and rest of the electrodes of the scan-side transparent electrode to a common potential, the slits having a slit width and a slit pitch equal to the arrangement intervals of the pixels are formed in the barrier liquid crystal panel so that side edges of the slits are arranged in positions opposed to centers of the pixels, to emit image light for three dimension (3D) display from each of pixels for left eye and pixels for right eye of the pixels of the image display panel to each direction from the barrier liquid crystal panel. In the third mode, by applying an alternating potential to an electrode predetermined as an electrode for viewing angle control among the plurality of electrodes forming the scan-side transparent electrode and fixing one or the plurality of electrodes forming the common-side transparent electrode and rest of the electrodes of the scan-side transparent electrode to a common potential, the slits having a slit width and a slit pitch narrower than the arrangement intervals of the pixels are formed in the barrier liquid crystal panel, and a viewing angle of the image light from the pixels of the image display panel is limited to a range specified for viewing angle control to emit the image light from the barrier liquid crystal panel.

Configuration Examples of Exemplary Embodiment

Next, one example of an exemplary embodiment of an image display unit according to the present invention will be described. First, FIG. 1 is an explanatory view schematically showing the principle of 3D display in an image display unit of a parallax barrier system which is one example of the image display unit according to the present invention. The image display unit of the parallax barrier system includes, as shown in FIG. 1, a barrier liquid crystal panel 100 which serves as a parallax barrier panel formed above an image display panel 10 that displays images formed of pixels for right eye 10R and pixels for left eye 10L. In the barrier liquid crystal panel, slits 100S that interrupt light (a slit width w is equal to the arrangement interval of the pixels for right eye 10R and the pixels for left eye 10L) are arranged at a predetermined pitch (slit pitch p). The image display unit is a technique for inputting images having a parallax (images of the pixels for right eye 10R and the pixels for left eye 10L) to a right eye 201 and a left eye 202 to give the illusion of stereoscopic images, i.e., 3D images.

Figure 3:
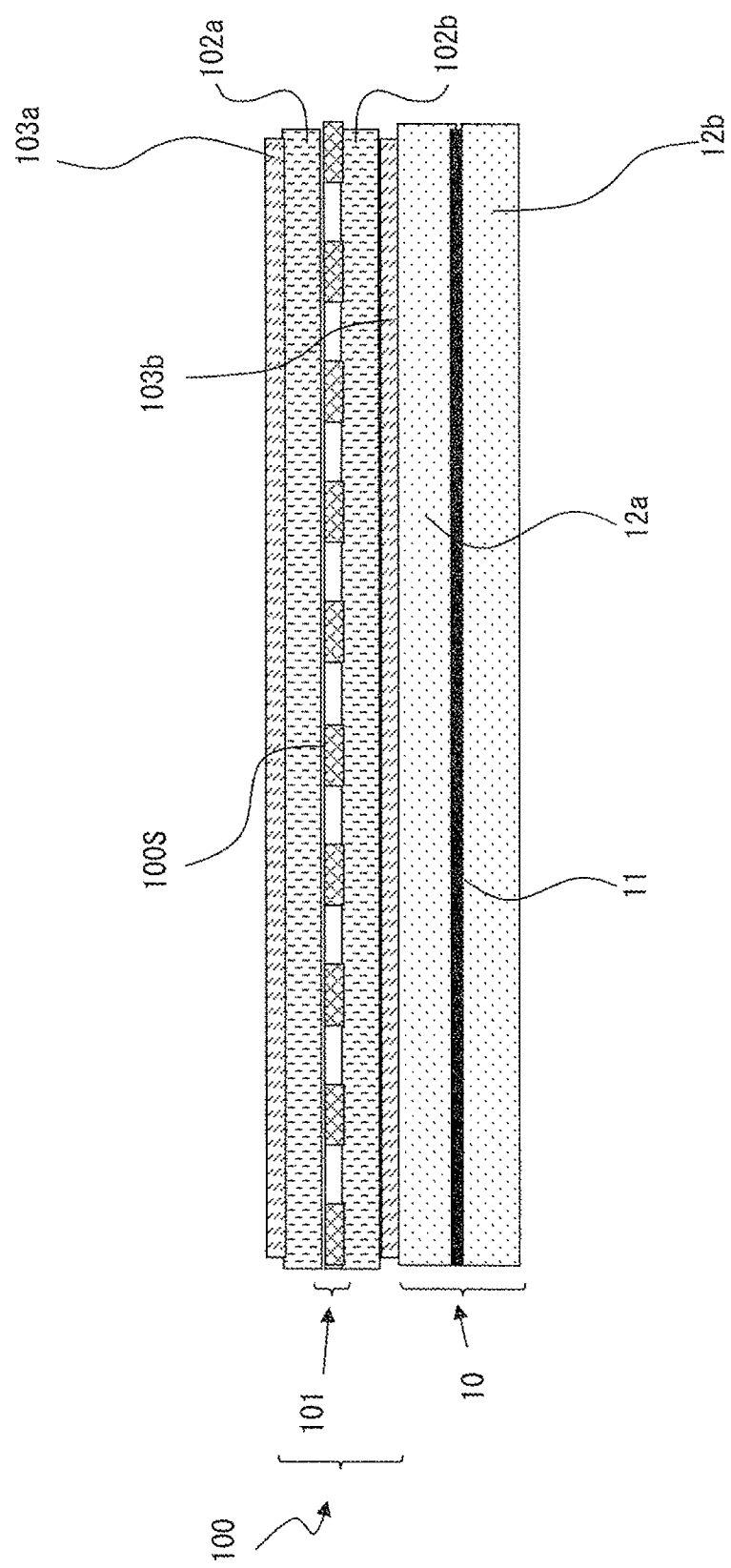
FIG. 3 is a cross-sectional view showing one example of a schematic cross-sectional structure of the image display unit of the parallax barrier system.
Figure 4:
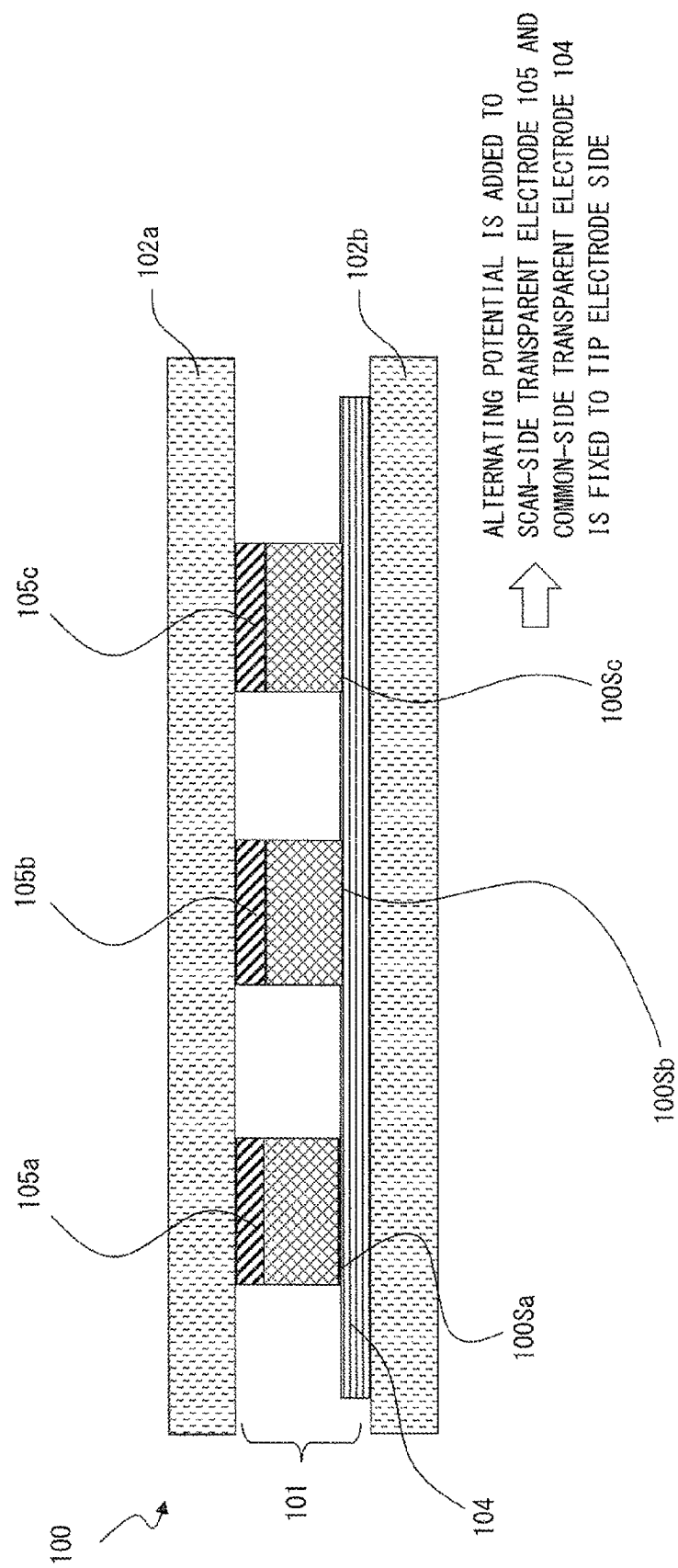
FIG. 4 is a cross-sectional view showing one example of a schematic cross-sectional structure of a barrier liquid crystal panel in the image display unit of the parallax barrier system shown in FIG. 3.

Next, with reference to FIGS. 3 and 4, a configuration example of the image display unit of the parallax barrier system that displays 3D images as shown in FIG. 1 will be described as one example of the image display unit according to the present invention. FIG. 3 is a cross-sectional view showing one example of a schematic cross-sectional structure of the image display unit of the parallax barrier system. FIG. 4 is a cross-sectional view showing one example of a schematic cross-sectional structure of the barrier liquid crystal panel 100 in the image display unit of the parallax barrier system shown in FIG. 3.

As shown in FIG. 3, the image display unit of the parallax barrier system includes the image display panel 10 for image display and the barrier liquid crystal panel 100 for forming a parallax barrier. The image display panel 10 includes a structure of holding a liquid crystal layer for display 11 to form the pixels for right eye 10R and the pixels for left eye 10L for image display by panel substrates 12a and 12b made of glass, acrylic or the like. On the other hand, the barrier liquid crystal panel 100 holds a barrier liquid crystal layer 101 to form the slits 100S for shielding light by panel substrates 102a and 102b made of glass, acrylic or the like. Further, this image display unit includes polarizers 103a and 103b for polarizing emitted light provided outside of the panel substrates 102a and 102b.

The barrier liquid crystal layer 101 of the barrier liquid crystal panel 100 shown in FIG. 3 is provided between a common-side transparent electrode 104 and scan-side transparent electrodes 105a, 105b, and 105c, as shown in the cross-sectional view of FIG. 4. The barrier liquid crystal layer 101 applies an alternating potential to the scan-side transparent electrodes 105a, 105b, and 105c in a state in which the common-side transparent electrode 104 is fixed to a common potential, thereby generating a potential difference at intersections between the common-side transparent electrode 104 and the scan-side transparent electrodes 105a, 105b, and 105c. In this way, slits 100Sa, 100Sb, and 100Sc to shield the image light emitted from the pixels of the image display panel 10 can be formed.

However, one component of the barrier liquid crystal panel 100 is added above the image display panel 10 to form a parallax barrier. This also causes some disadvantages including an increase in thickness as the image display unit and reduction in light transmittance. Therefore, only the effect that 3D images are displayed is not sufficient to make up for these disadvantages.

According to the present invention, as a system which more than compensates for these disadvantages, an electrode structure including sets of electrodes, each set including one or a plurality of electrodes, is employed as the barrier liquid crystal layer 101, and a control method of the electrodes is appropriately switched according to an operation mode. Accordingly, it is possible to perform not only a 3D image display function but also a viewing angle control function. Specifically, by appropriately switching the control method of the electrodes according to the operation mode, it is possible to change the slit width/slit pitch/slit thickness/distance between the display surface and the slit surface and the like of the slits 100S forming the barrier liquid crystal panel 100 as desired, and to change the viewing angle of the liquid crystal display screen of the image display unit in principle. Using this principle, for example, switching from a first mode of a normal 2D display function to a second mode of a 3D display function, switching from the second mode of the 3D display function back to the normal 2D display function are made possible. Furthermore, switching to a third mode of the viewing angle control function, switching from the third mode of the viewing angle control function back to the first mode of the normal 2D display function and the like are made possible. This brings about the effect specific to the present invention that it is possible to use three kinds of functions (operation modes) according to the scene.

Figure 2:
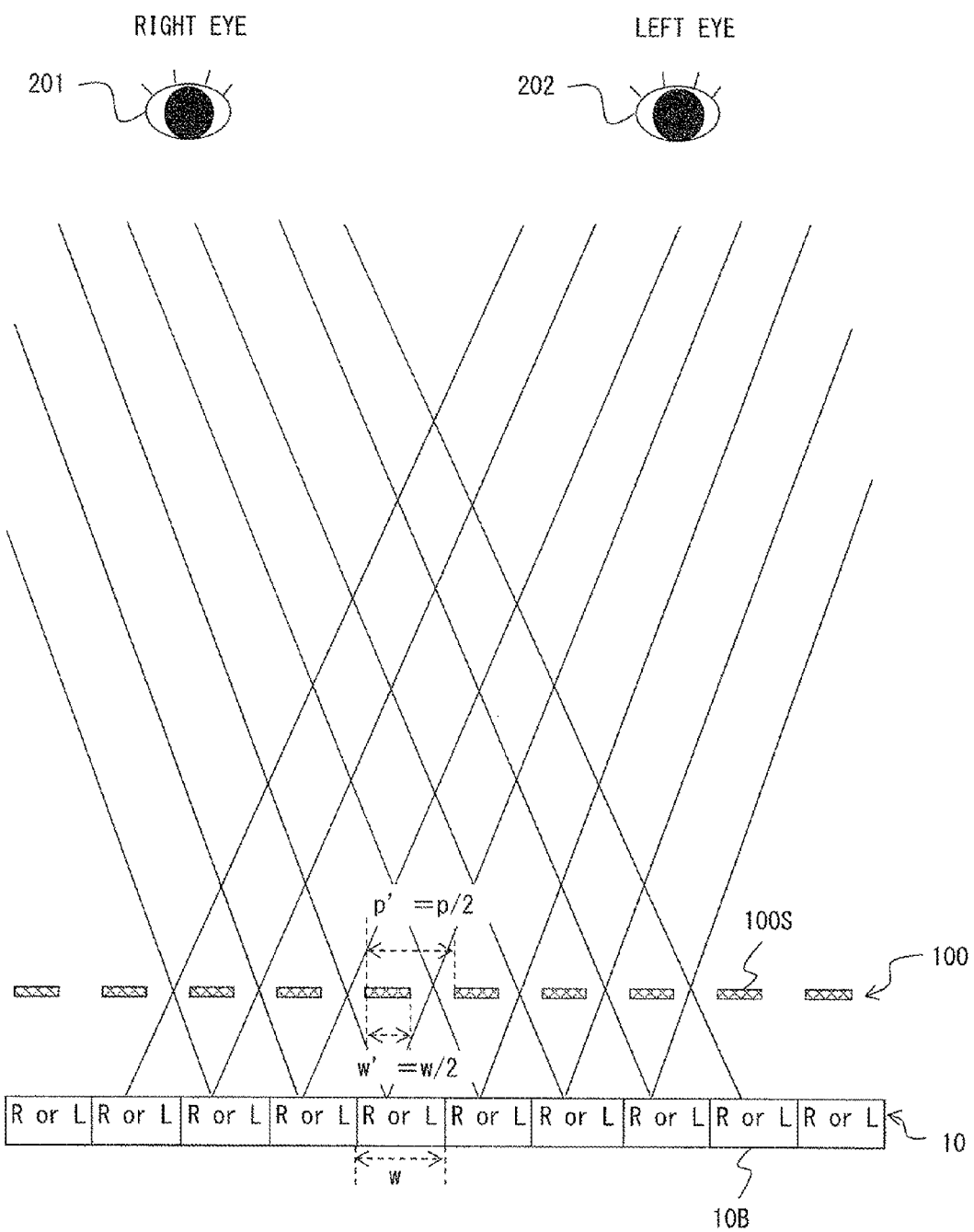
FIG. 2 is an explanatory view schematically showing the principle for achieving a viewing angle control function in the image display unit of the parallax barrier system.

Next, with reference to FIG. 2, an example of achieving the viewing angle control function to control the viewing angle in the image display unit of the parallax barrier system which is one example of the present invention stated above with reference to FIGS. 3 and 4 will be described. FIG. 2 is an explanatory view schematically showing the principle for achieving the viewing angle control function in the image display unit of the parallax barrier system. FIG. 2 shows an example of changing each of a slit pitch p' and a slit width w' of the slits 100S formed in the barrier liquid crystal panel 100 above the image display panel 10 to ½ (i.e., p'=p/2, w'=w/2) compared to the example of achieving 3D display described with reference to FIG. 1. In short, FIG. 2 shows an example of achieving the third mode of the viewing angle control function, as is different from the state of achieving the second mode of the 3D display function shown in FIG. 1.

While the slit pitch p' and the slit width w' of the slits 100S are halved in FIG. 2 compared to those in the 3D display shown in FIG. 1, the density of the number of openings of the slits is doubled. Accordingly, an in-line transmittance of light from the image display panel 10 (brightness in a front view) is provisionally set presupposing that the in-line transmittance of light is not changed from that in FIG. 1 and the optimum input angle to the right eye 201 and the left eye 202 adjusted in the 3D display is not changed.

Further, when the slit pitch p'/slit width w' are changed from the slit pitch p/slit width w in the 3D display shown in FIG. 1, the images displayed in the pixels for right eye 10R and the pixels for left eye 10L of the image display panel 10 need to be changed to pixels for both eyes 10B so that the same image is input to both of the right eye 201 and the left eye 202 or normal images (normal 2D images) are displayed in which the resolution of the image screen is effectively used. If the pixels of the image display panel 10 are left as in the 3D display as shown in FIG. 1, i.e., the pixels of the image display panel 10 are left as the pixels for right eye 10R and the pixels for left eye 10L, two kinds of images displayed by the pixels for right eye 10R and the pixels for left eye 10L are input into both of the right eye 201 and the left eye 202, and the images are visually recognized as double images.

As stated above, it would be easily imagined that the user's visibility when the normal images (normal 2D images) are displayed in a state in which the slits 100S having the slit pitch p' and the slit width w' are formed in the barrier liquid crystal panel 100 above the image display panel 10 is equal to a viewing image when a louver (louver sheet) is attached to a normal image display panel (image screen).

Figure 5A:
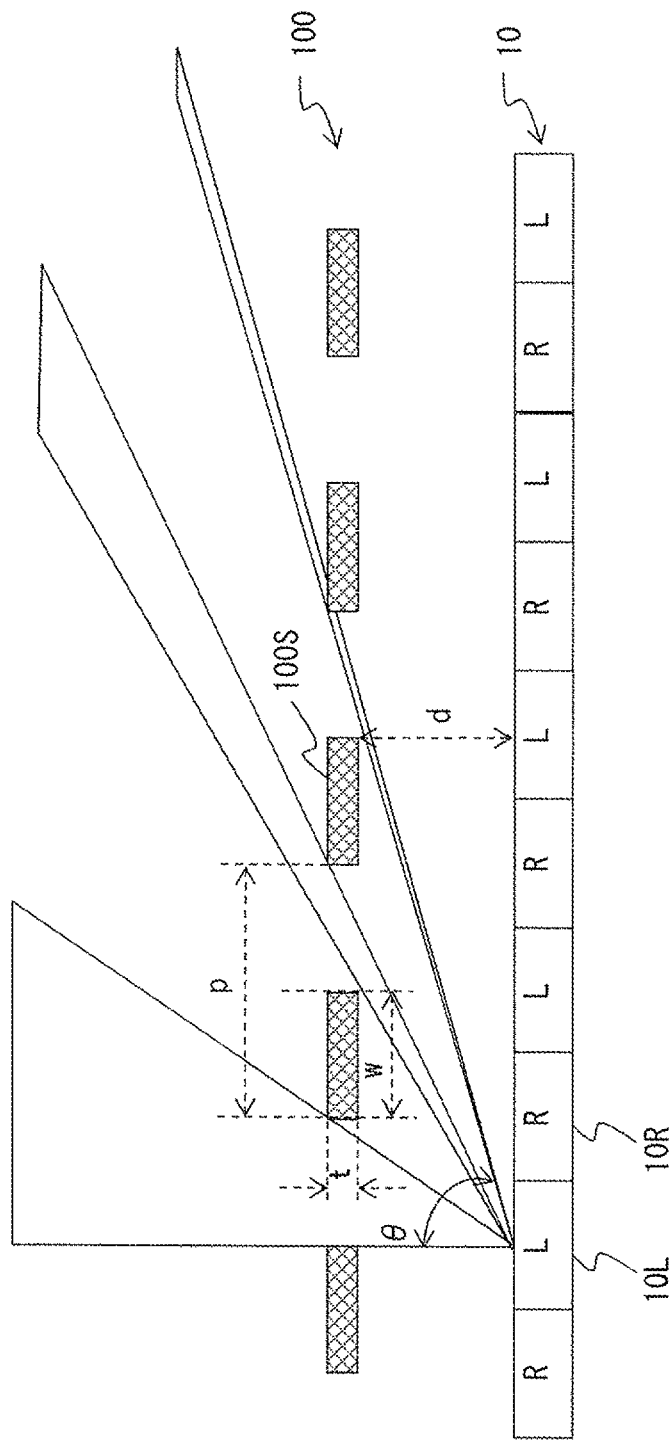
FIG. 5A is an explanatory view for describing a state of a light flux that transmits between slits before a slit pitch and a slit width of the slits formed in the barrier liquid crystal panel above an image display panel are changed.
Figure 5B:
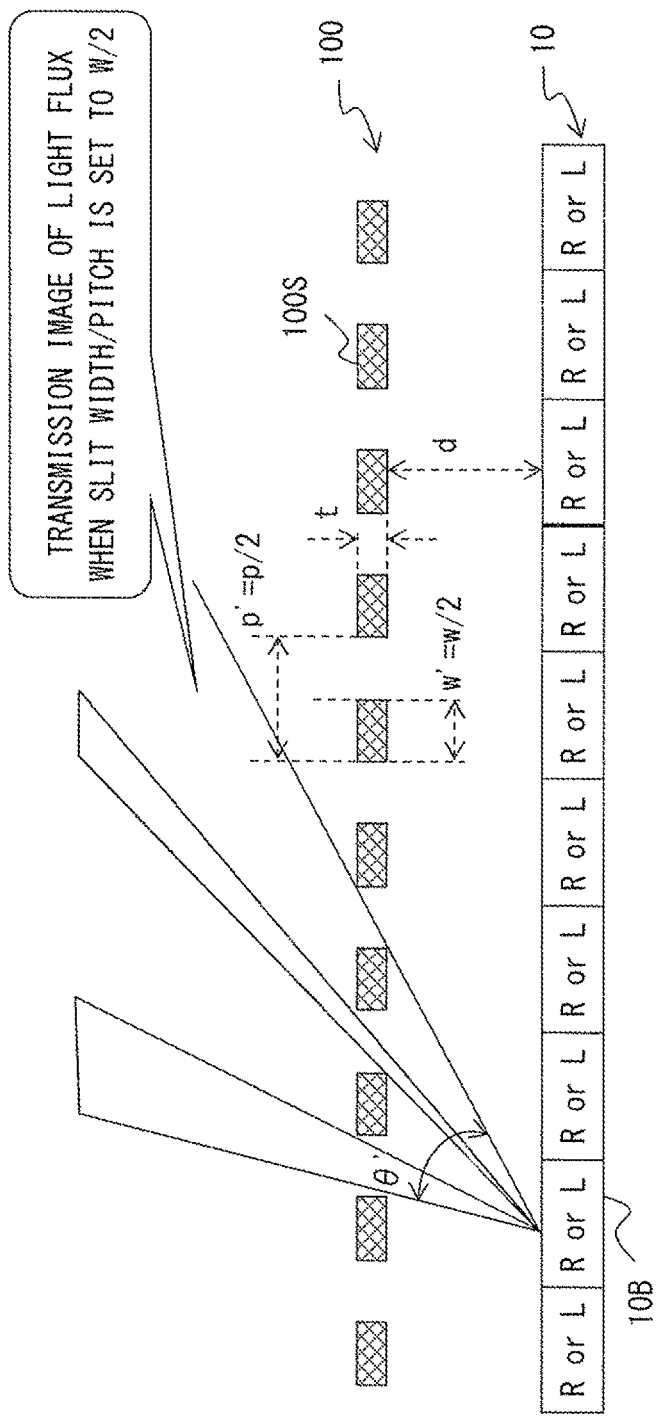
FIG. 5B is an explanatory view for describing a state of the light flux that transmits between slits after the slit pitch and the slit width of the slits formed in the barrier liquid crystal panel above the image display panel are changed.

Next, with reference to FIGS. 5A and 5B, a state of light flux that can transmit between the slits 100S when the slit pitch p' and the slit width w' of the slits 100S formed in the barrier liquid crystal panel 100 above the image display panel 10 are halved from the slit pitch p and the slit width w for 3D display (i.e., the pixel arrangement interval w of the pixels for both eyes 10B of the image display panel 10). FIG. 5A and FIG. 5B are explanatory views for describing the state of the light flux that transmits between the slits when the slit pitch and the slit width of the slits 100S formed in the barrier liquid crystal panel 100 above the image display panel 10 are changed.

FIG. 5A shows a state of the light flux when the second mode for 3D display is specified as the operation mode and the slits 100S are formed to have the slit pitch p and the slit width w for 3D display. FIG. 5B shows a state of the light flux when the third mode for viewing angle control is specified as the operation mode and the slits are formed to have the slit pitch p' and the slit width w' in which the slit pitch p and the slit width w for 3D display shown in FIG. 5A are halved. In order to simplify the description, FIG. 5A and FIG. 5B show simplified diagrams in which the panel substrates 12a and 12b and 102a and 102b for holding the liquid crystal layer for display 11 and the barrier liquid crystal layer 101, the polarizers 103a and 103b as described in FIGS. 3 and 4, a refractive index of the liquid crystal and the like are not considered.

As simplified in FIG. 5A and FIG. 5B, an angle θ of the light flux (i.e., a viewing cone indicating the viewing angle) of the light that is emitted from one of the pixels for both eyes 10B and is able to transmit between the slits 100S is restricted by the slit width w/slit pitch p/slit thickness t/distance d between the pixel and the slit. When the slits 100S formed in the barrier liquid crystal panel 100 are changed from the state shown in FIG. 5A to the state of the slit width w'/the slit pitch p'/slit thickness t/distance d between the pixel and the slit shown in FIG. 5B, for example, an angle θ' of the light flux that is able to transmit is changed, which affects the viewing angle at which the light emitted from the liquid crystal layer for display 11 (image light) can be visibly recognized.

Figure 6:
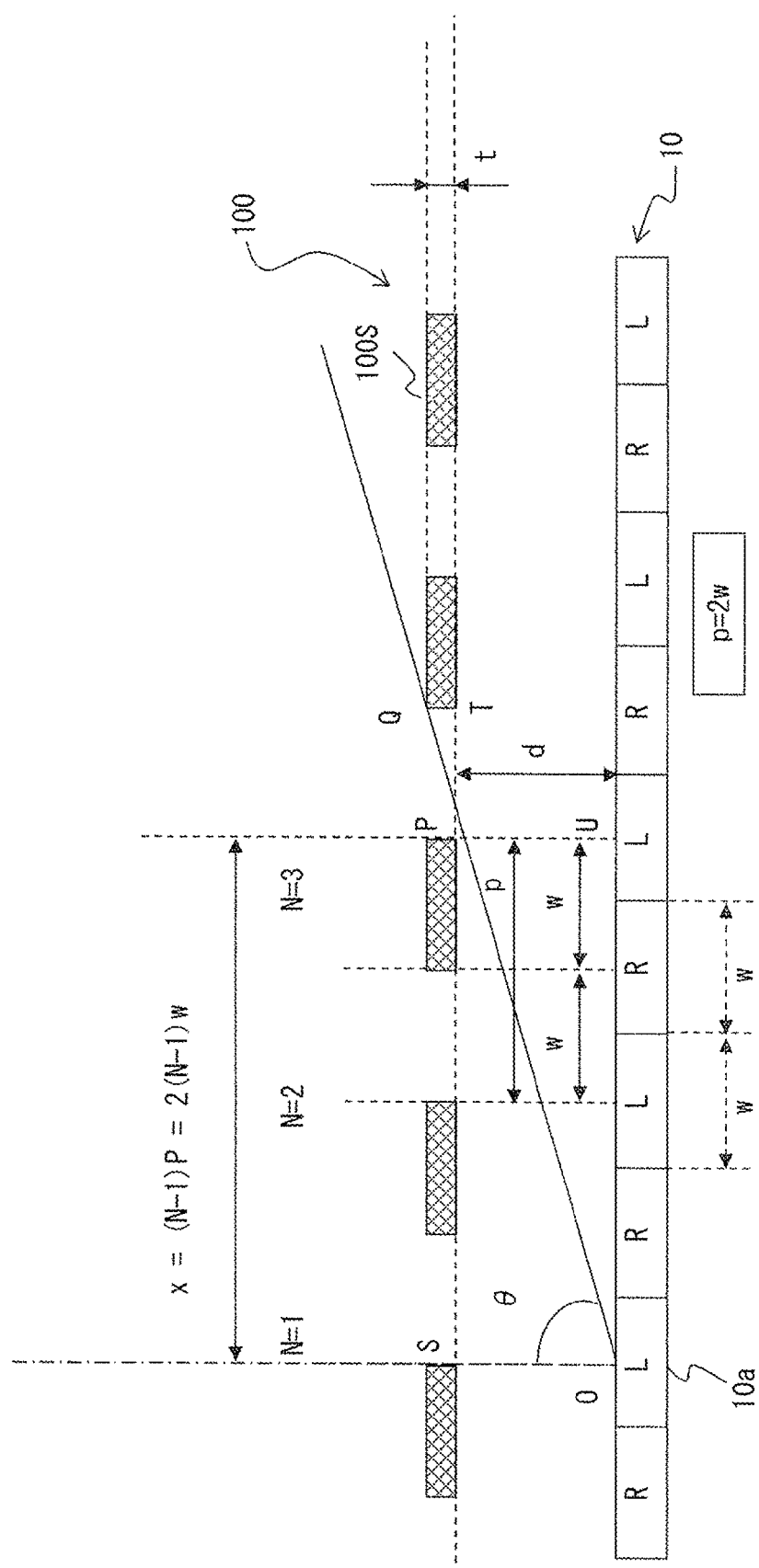
FIG. 6 is an explanatory view for simply deriving a relation between a viewing cone and a shape of slits formed in the barrier liquid crystal panel above the image display panel.
Figure 7:
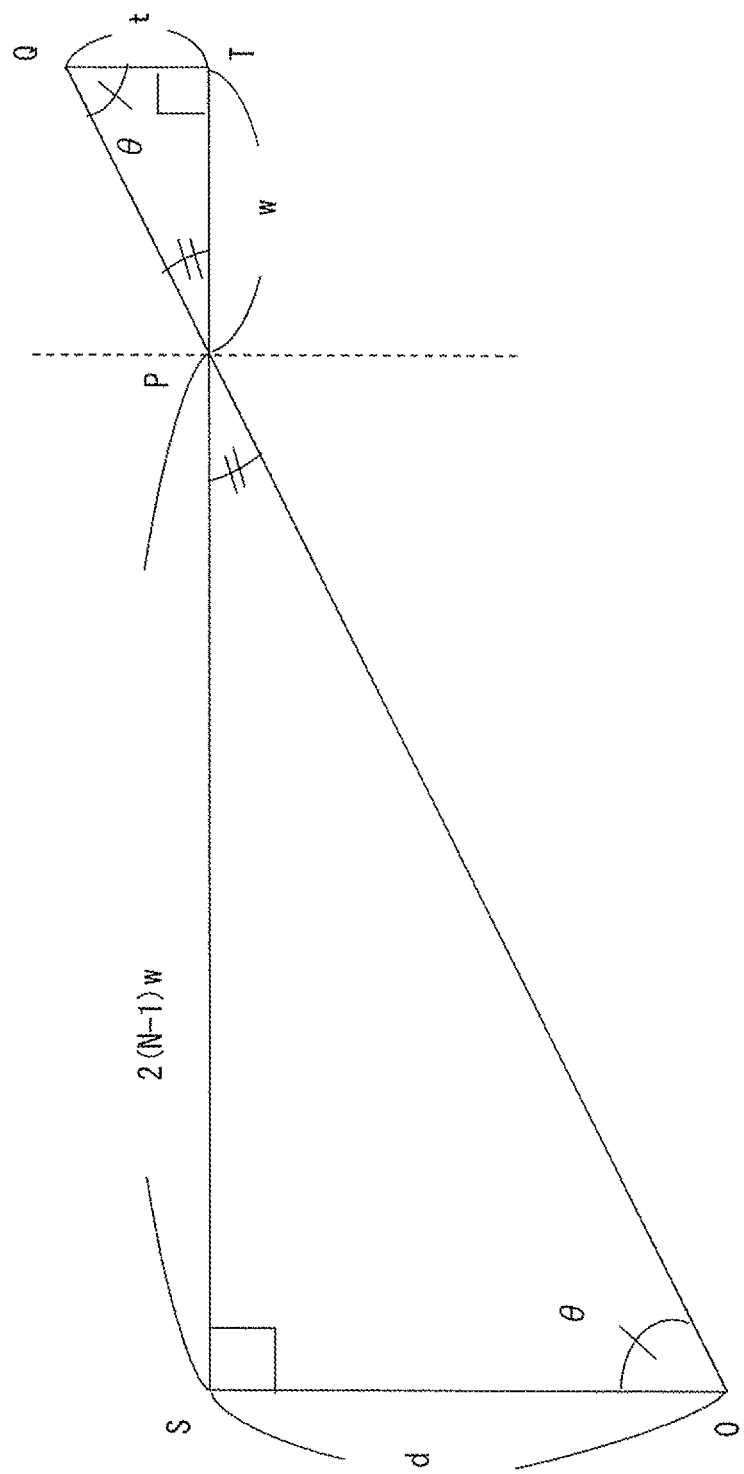
FIG. 7 is an explanatory view for describing a typical relation between the shape of the slits and the viewing cone derived in FIG. 6.

Next, with reference to FIGS. 6 and 7, a relation between the viewing cone θ, i.e., the viewing angle of the light flux from the image display panel 10 and the slit pitch p, the slit width w, the slit thickness t, the distance d between the pixel and the slit of the slits 100S formed in the barrier liquid crystal panel 100 above the image display panel 10 will be described. FIG. 6 is an explanatory view for simply deriving a relation between the viewing cone θ and the shape of the slits 100S formed in the barrier liquid crystal panel 100 above the image display panel 10. FIG. 7 is an explanatory view for describing a typical relation between the shape of the slits 100S and the viewing cone θ derived in FIG. 6. Both of FIG. 6 and FIG. 7 show images for deriving conditions regarding the viewing cone θ (viewing angle).

FIG. 6 and FIG. 7 each show an example of setting the slit pitch p of the slits 100S to be twice as large as the slit width w. The opening width of the barrier liquid crystal panel 100 that transmits the image light emitted from each pixel of the image display panel 10 is set to be the same size as the slit width w of the slits 100S that shield the image light. In summary, a case is assumed in which both of the slit width w of the slits 100S and the opening width w of the barrier liquid crystal panel 100 are set to have the same size as the cell pitch indicating the arrangement intervals of the pixels of the image display panel 10. Further, a side edge of each slit is arranged in a position which is extended vertically from the center of each pixel of the image display panel 10.

As shown in FIG. 6, when the distance between the pixel and the slit indicating the distance from the display surface of the image display panel 10 to the lower end of the slits 100 is denoted by d, the slit width of the slits 100S is denoted by w, the slit pitch of the slits 100S is denoted by p=2w, the slit thickness is denoted by t, and the angle between the border line at which the image light emitted from the image display panel 10 cannot transmit through the barrier liquid crystal panel 100 and the vertical line to the display surface of the image display panel 10, i.e., a viewing cone (viewing angle) is denoted by θ, a parallel distance x from the center O of one of the pixels 10a to a side edge P of the N-th (N=1, 2, 3, . . . ) slit 100S (the distance measured in parallel with the display surface of the image display panel 10, i.e., the distance from the center O of the pixel 10a to a location U of the display surface of the image display panel 10 immediately below the side edge P of the N-th slit 100S) is given by the following expression.

$$x=(N-1)p=2(N-1)w$$

Meanwhile, from a similar relation between a triangle OPS and a triangle QPT shown in FIG. 6, the following relation can be derived as shown in FIG. 7.

$$2(N-1)w:w=d:t$$

$$\therefore N=(d+2t)/2t$$

(However, since N is an integer of one or larger, digits after the decimal point are truncated.)

When the barrier liquid crystal panel 100 is formed under the conditions shown in FIG. 6, the viewing cone θ (viewing angle) between the center O of one of the pixels 10a and the side edge P of the slit 100S corresponding to the N-th slit which is counted from the slit 100S whose side edge S is positioned on the vertical line of the center O of the pixel 10a in the oblique direction is given by the following expression, as shown in FIG. 6 and FIG. 7.

$$\tan\theta = 2(N-1)w/d$$

Figure 8:
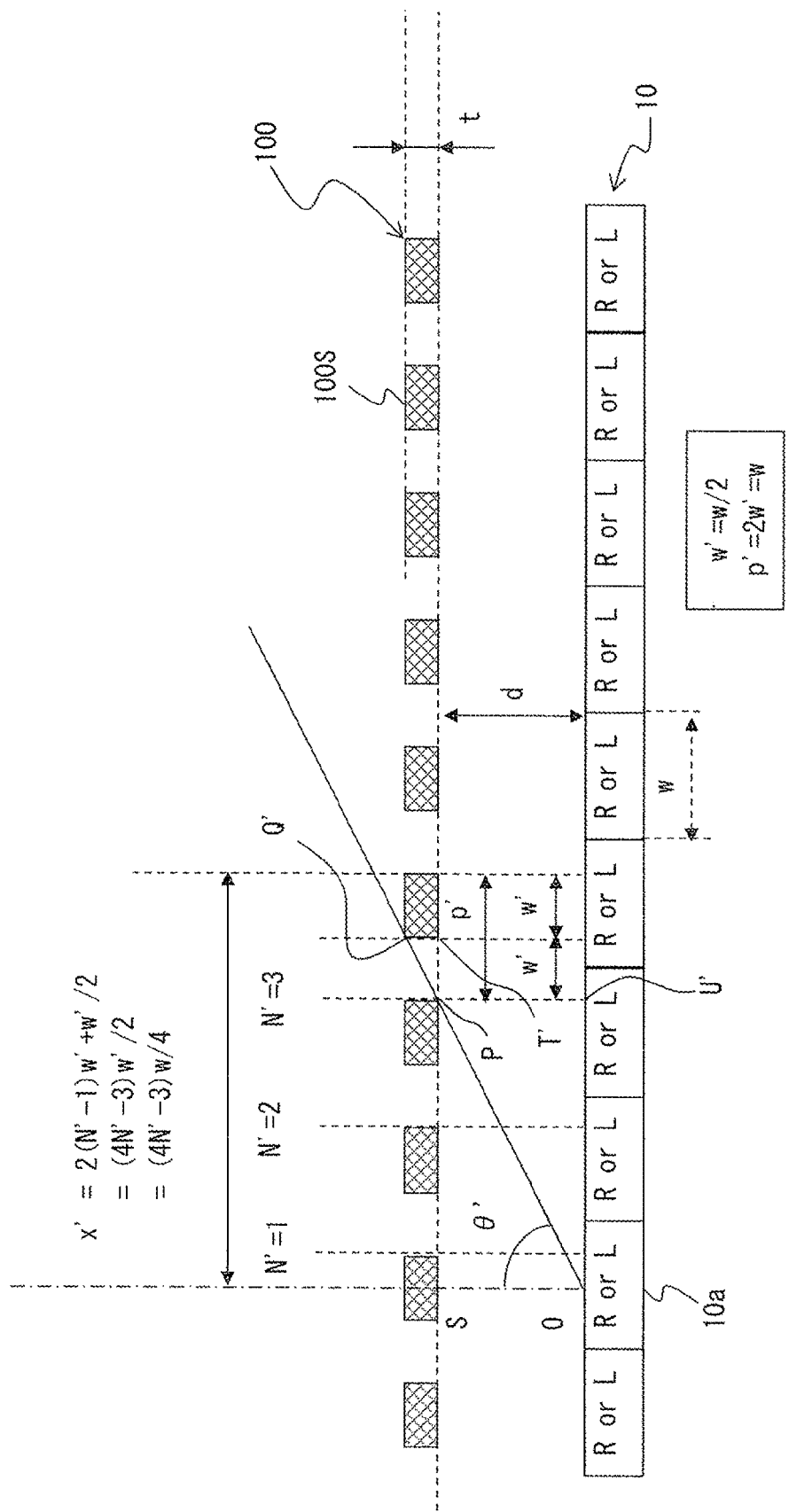
FIG. 8 is an explanatory view for simply deriving a relation between the viewing cone and the shape of the slits when the slit pitch and the slit width of the slits formed in the barrier liquid crystal panel above the image display panel are changed.

Next, with reference to FIG. 8, a relation with the viewing cone θ' or the viewing angle of the light flux from the image display panel 10 when the slit pitch p and the slit width w for 3D display shown in FIG. 5A is halved to the slit pitch p' and the slit width w' as shown in FIG. 5B will be described. FIG. 8 is an explanatory view for simply deriving a relation between the viewing cone θ' and the shape of the slits 100S when the slit pitch and the slit width of the slits 100S formed in the barrier liquid crystal panel 100 above the image display panel 10 are changed. FIG. 8 shows a case in which each of the slit pitch p and the slit width w for 3D display shown in FIG. 6 is halved to the slit pitch p'(=p/2) and the slit width w'(=w/2).

FIG. 8 also shows an example of setting the slit pitch p' of the slits 100S to be twice as large as the slit width w'. Further, it is assumed that the cell pitch indicating the pixel arrangement interval of the image display panel 10 has the interval w which is the same to that in FIG. 6. Further, the positional relation between each of the slits 100S and each pixel of the image display panel 10 is, as is different from the case of FIG. 6, such that the center of each slit 100S is formed in a position which is extended vertically from the center of each pixel of the image display panel 10.

In the case shown in FIG. 8, as is similar to the case shown in FIG. 6, when the distance between the pixel and the slit indicating the distance from the display surface of the image display panel 10 to the lower end of the slit 100S is denoted by d, the slit width of the slits 100S is denoted by w'(=w/2), the slit pitch of the slits 100S is denoted by p'=2w'(=w), the slit thickness is denoted by t, and the angle between the border line at which the image light emitted from the image display panel 10 cannot transmit through the barrier liquid crystal panel 100 and the vertical line to the display surface of the image display panel 10, i.e., a viewing cone (viewing angle), is denoted by θ', a parallel distance x' from the center O of one of the pixels 10a to a side edge p' of the N'-th (N'=1, 2, 3, . . . ) slit 100S (the distance measured in parallel with the display surface of the image display panel 10, i.e., the distance from the center O of the pixel 10a to a location U' of the display surface of the image display panel 10 immediately below the side edge P' of the N'-th slit 100S) is given by the following expressions.

$$\begin{aligned}x' &= (N'-1)p + w'/2 \\ &= 2(N'-1)w' + w'/2 \\ &= (4N'-3)w'/2 \\ &= (4N'-3)w/4\end{aligned}$$

Meanwhile, from a similar relation between a triangle OP'S and a triangle Q'P'T', the following relation can be derived.

$$(4N'-3)w'/2:w' = d:t$$

$$\therefore N' = (2d+3t)/4t$$

(However, since N' is an integer of one or larger, digits after the decimal point are truncated.)

When the barrier liquid crystal panel 100 is formed under the conditions shown in FIG. 8, the viewing cone θ' (viewing angle) between the center O of one of the pixels 10a and the side edge P' of the slit 100S corresponding to the N'-th slit which is counted from the slit 100S whose center S is positioned on the vertical line of the center O of the pixel 10a in the oblique direction is given by the following expressions, as shown in FIG. 8.

$$\begin{aligned}\tan\theta' &= (4N'-3)w'/2d \\ &= (4N'-3)w/4d\end{aligned}$$

Now, a relation between the viewing cone θ (viewing angle) when the barrier liquid crystal panel 100 is formed under the conditions shown in FIG. 6 and FIG. 7 and the viewing cone θ' (viewing angle) when the barrier liquid crystal panel 100 is formed under the conditions shown in FIG. 8 is as follows.

$$\tan\theta:\tan\theta' = 2(N-1)w/d:(4N'-3)w/4d$$

$$\therefore \tan\theta/\tan\theta' = 8(N-1)/(4N'-3)$$

For example, if it is assumed that d=0.5 mm, t=0.02 mm, and w=0.08 mm, the following expressions are obtained.

$$N=13$$

$$N'=13$$

$$\tan\theta = 3.84 \therefore \theta \approx 75°$$

$$\tan\theta' = 1.96 \therefore \theta' \approx 63°$$

In summary, for example, when the slit width w' and slit pitch p' of the slits 100S are halved from the slit width w and the slit pitch p, the viewing angle at which the image light from the pixels of the image display panel 10 can be visibly recognized can be limited from 75° to 63°.

Further, the viewing cone θ (viewing angle) can be changed not only by changing the slit width w/slit pitch p but also by changing the slit thickness t, the distance d between the pixel and the slit or the like. Furthermore, it is possible to change the viewing cone θ (viewing angle) more efficiently by the combination with a liquid crystal material used for image display, contrast adjustment by grayscale adjustment, luminance adjustment or the like.

In reality, further introduction of parameters such as the refractive index or the transmittance of elements forming the image display unit may have some kind of influence on the viewing cone θ (viewing angle). However, such factors may naturally be treated as variation factors that can be assumed in the exemplary embodiment.

Further, in order to achieve the effect of arbitrarily controlling the viewing cone θ (viewing angle) as stated above, it is required to switch the slit width w/slit pitch p of the slits 100S formed in the barrier liquid crystal layer 101 of the barrier liquid crystal panel 100 from the state of the 3D display, for example, as described above. One example of a method of switching the second mode for 3D display as shown in FIG. 6 to the third mode for viewing angle control as shown in FIG. 8 will be described below.

The following electrodes arranged in the barrier liquid crystal layer 101 of the barrier liquid crystal panel 100 are the scan-side transparent electrodes 105a to 105c described with reference to FIG. 4, and are formed as transparent electrodes together with the common-side transparent electrode 104 in order to transmit the image light emitted from each pixel of the image display panel 10. Further, a case is shown in which the barrier liquid crystal layer 101 of the barrier liquid crystal panel 100 forms the slits 100S in the corresponding areas assuming a case of "normally white", thereby setting the image light emitted from each pixel of the image display panel 10 to a non-transmittance state.

Figure 9:
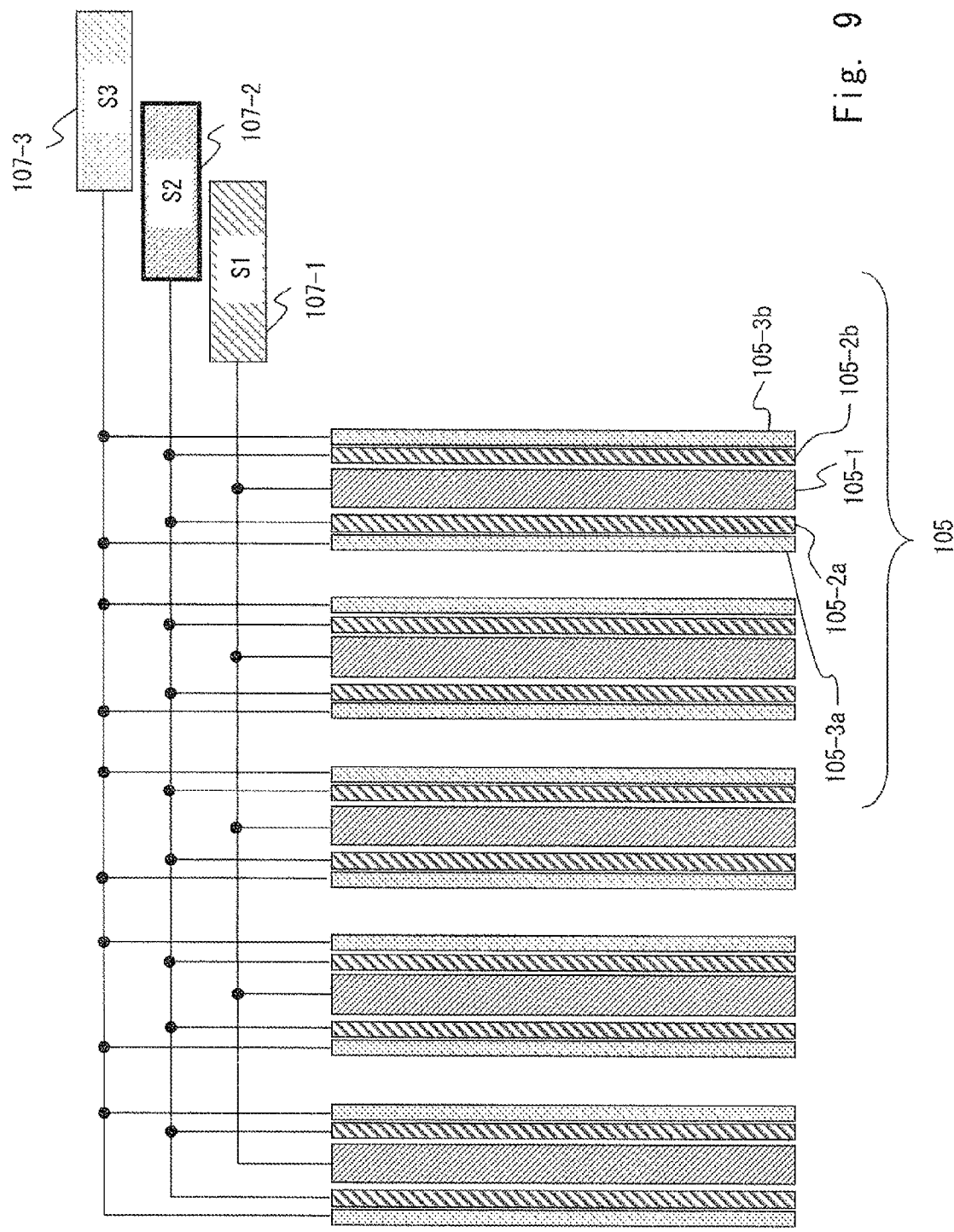
FIG. 9 is a schematic view showing one example of an electrode structure of a scan-side transparent electrode for switching the slit width/slit pitch of the slits formed in the barrier liquid crystal panel above the image display panel.

FIG. 9 is a schematic view showing one example of the electrode structure of the scan-side transparent electrode 105 to switch the slit width w/slit pitch p of the slits 100S formed in the barrier liquid crystal panel 100 above the image display panel 10. FIG. 9 shows an example of switching the viewing cone θ and the viewing cone θ' of the light emitted from the image display surface of the image display panel 10 by controlling each electrode and switching the slit width w/slit pitch p shown in FIG. 6 and the slit width w'/slit pitch p' shown in FIG. 8, in order to control the viewing angle of the image display unit according to the operation mode of the image display unit.

As shown in FIG. 9, the scan-side transparent electrode 105 is formed of electrode groups each including a set of five electrodes of one first electrode 105-1, two second electrodes 105-2a and 105-2b arranged on the respective sides of the first electrode 105-1, and two third electrodes 105-3a and 105-3b arranged outside of the two second electrodes 105-2a and 105-2b, respectively. The first electrode, the second electrodes, and the third electrodes are connected to a first electrode drive circuit (S1) 107-1, a second electrode drive circuit (S2) 107-2, and a third electrode drive circuit (S3) 107-3 for scan-side transparent electrode, respectively.

Note that the electrode width of the first electrode 105-1 is substantially half (≈w/2) of the slit width w (the arrangement interval w of pixels of the image display panel 10) of the slits 100S for 3D display shown in FIG. 6. The electrode width of each of the two second electrodes 105-2a and 105-2b and the two third electrodes 105-3a and 105-3b is substantially ¼ (≈w/4) of the slit width w (the arrangement interval w of pixels of the image display panel 10) of the slits 100S for 3D display shown in FIG. 6. The opening width of a gap part where there is no electrode, i.e., an area between a set of an electrode group of five electrodes of the scan-side transparent electrode 105 and a set of the next electrode group, has substantially half (≈w/2) the width of the slit width w (the arrangement interval w of pixels of the image display panel 10) of the slits 100S shown in FIG. 6. The reason for which the electrode width and the opening width are expressed using the term "substantially" compared to the slit width w (pixel arrangement interval w) is that it is required to form the electrode patterns through an insulating film so as to prevent short-circuit between electrodes, and the electrode width and the opening width are somewhat different from the slit width w (pixel arrangement interval w) depending on the film forming accuracies of the insulating film and the electrode materials.

Figure 10:
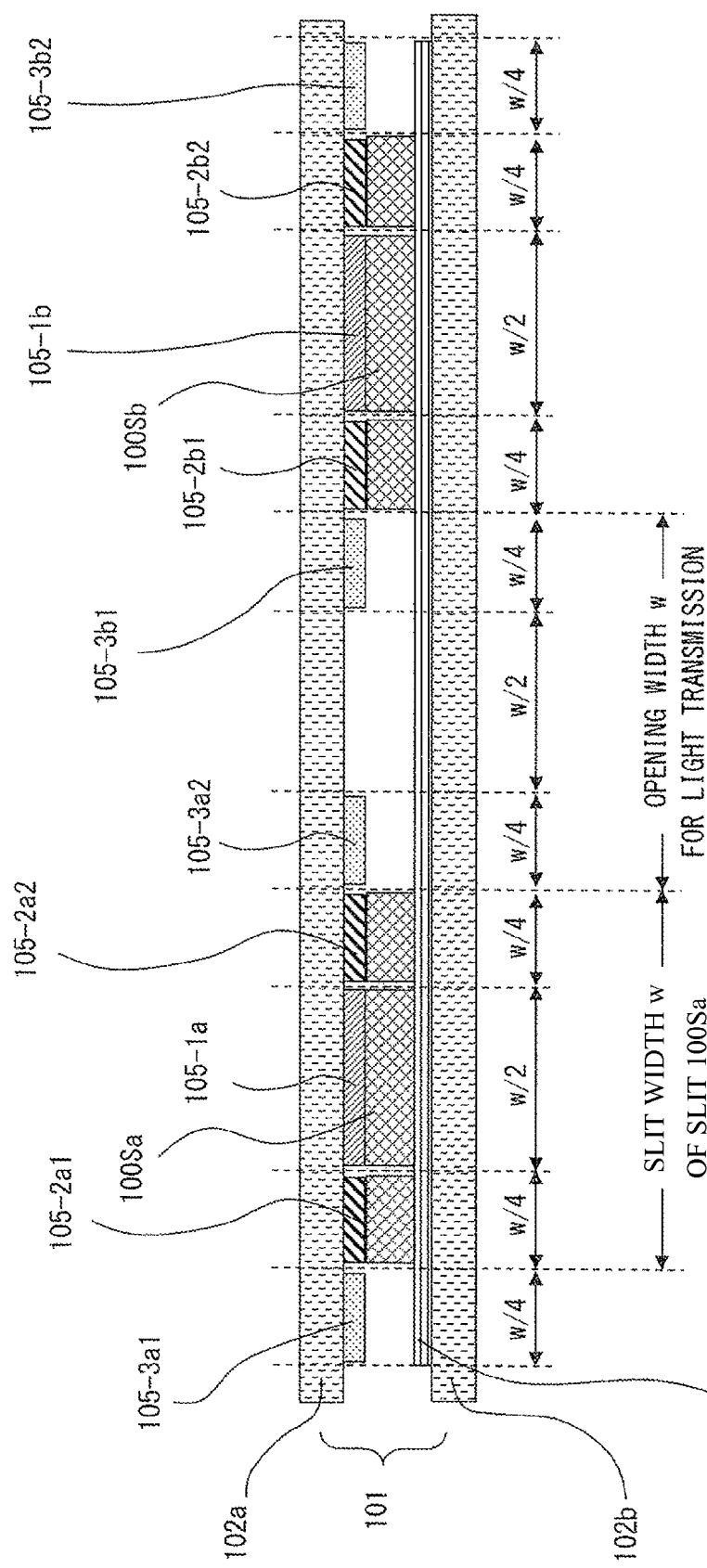
FIG. 10 is a cross-sectional view showing one example of an internal state inside the barrier liquid crystal panel above the image display panel in a second mode for 3D display as shown in FIG. 6.
Figure 11:
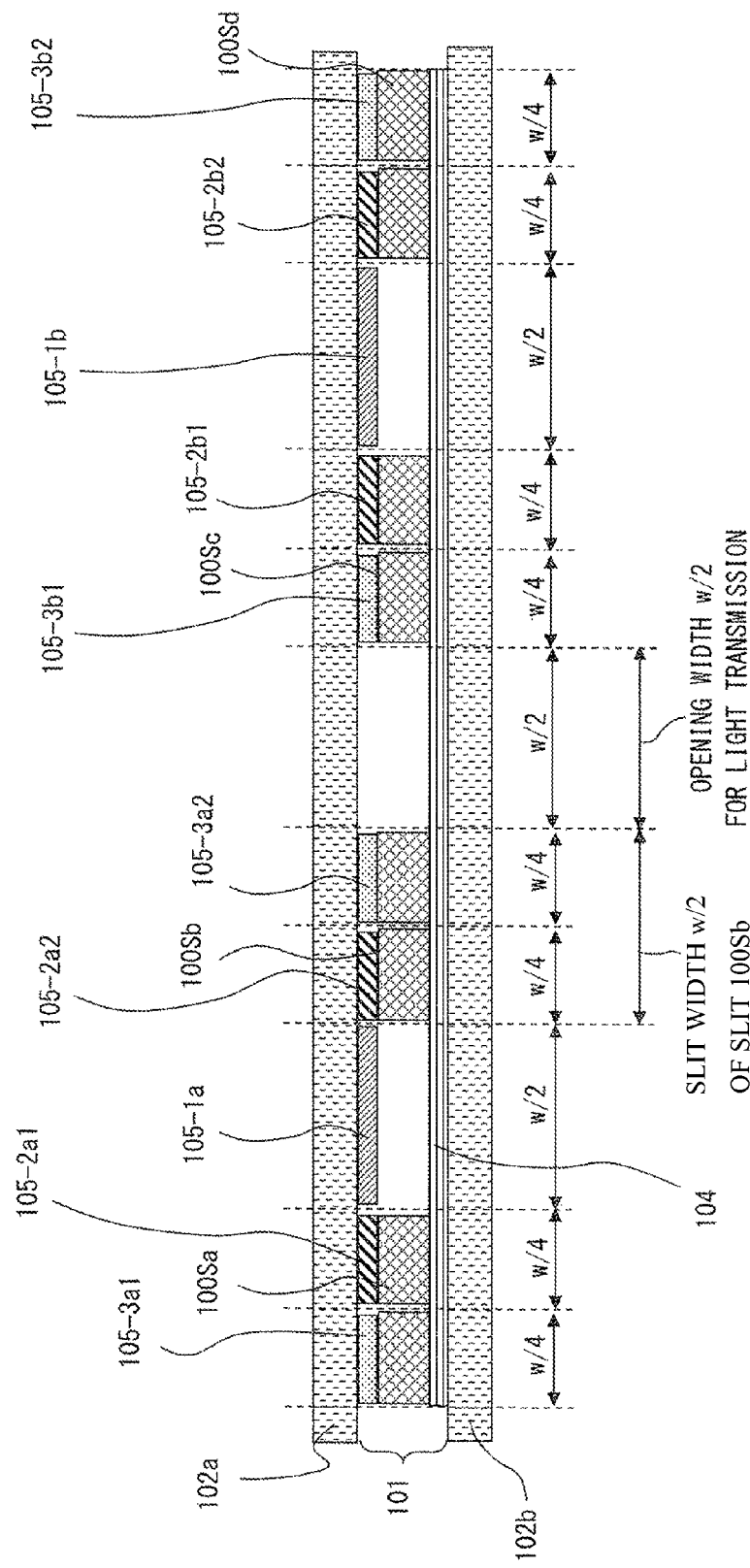
FIG. 11 is a cross-sectional view showing one example of an internal state inside the barrier liquid crystal panel above the image display panel in a third mode for viewing angle control as shown in FIG. 8.

However, it is desirable to definitely secure a minimum electrode width for forming the slits 100S having a constant slit width w as the barrier liquid crystal layer 101 of the barrier liquid crystal panel 100. As shown in FIGS. 10 and 11 described later, the first electrode 105-1 is arranged to substantially cover half (=w/2) the area of the slit width w, and each of the second electrodes 105-2a and 105-2b and the two third electrodes 105-3a and 105-3b is arranged to substantially cover one quarter (=w/4) of the area of the slit width w.

In FIG. 9, when the mode is switched to the second mode for 3D display as shown in FIG. 6, both of the first electrode drive circuit (S1) 107-1 and the second electrode drive circuit (S2) 107-2 are driven that are defined in advance for 3D display according to the instruction to switch the operation mode, to apply an alternating potential to one first electrode 105-1 having an electrode width of (w/2) and two second electrodes 105-2a and 105-2b each having an electrode width of (w/4) arranged on the respective sides of the first electrode 105-1. In this way, switching can be made so that the width of the slits 100S that shield transmission of the image light emitted from each pixel of the image display panel 10 is substantially equal to the pixel arrangement interval w, and the opening width of the barrier liquid crystal panel 100 through which the image light transmits is also substantially equal to the pixel arrangement interval w. Further, the slits 100s may be formed so that the side edge of each of the slits 100S is opposed to the position of the center of each pixel of the image display panel 10.

Meanwhile, when the mode is switched to the third mode for viewing angle control as shown in FIG. 8, both of the second electrode drive circuit (S2) 107-2 and the third electrode drive circuit (S3) 107-3 are driven that are defined in advance for viewing angle control according to the instruction to switch the operation mode, to apply an alternating potential to the two second electrodes 105-2a and 105-2b each having an electrode width of (w/4) and the two third electrodes 105-3a and 105-3b each having an electrode width of (w/4) adjacently arranged outside of the second electrodes 105-2a and 105-2b, respectively. In this way, switching can be made so that the width of the slits 100S that shield transmission of the image light emitted from each pixel of the image display panel 10 becomes substantially half the width (w/2) of the pixel arrangement interval w, and the opening width of the barrier liquid crystal panel 100 through which the image light transmits also becomes substantially half the width (w/2) of the pixel arrangement interval w. Further, the slits 100S may be formed so that the center of each of the slits 100S is opposed to the position of the center of each pixel of the image display panel 10.

As described above, FIGS. 10 and 11 each show a cross-sectional view of an internal state of the barrier liquid crystal layer 101 of the barrier liquid crystal panel 100 when switching between the second mode for 3D display as shown in FIG. 6 and the third mode for viewing angle control as shown in FIG. 8 is performed. FIG. 10 is a cross-sectional view showing one example of an internal state inside the barrier liquid crystal panel 100 above the image display panel 10 in the second mode for 3D display as shown in FIG. 6, and FIG. 11 is a cross-sectional view showing one example of an internal state inside the barrier liquid crystal panel 100 above the image display panel 10 in the third mode for viewing angle control as shown in FIG. 8. In FIG. 10 and FIG. 11, an example in which the common-side transparent electrode 104 is formed as a single electrode pattern is shown for the sake of simplicity. Further, although not shown in FIG. 10 and FIG. 11, the positional relation with each pixel of the image display panel 10 is adjusted so that the center of each pixel of the image display panel 10 is arranged in the position opposed to the position of the border line between each of second electrodes 105-2a1, 105-2a2, 105-2b1, and 105-2b2 and each of third electrodes 105-3a1, 105-3a2, 105-3b1, and 105-3b2 of the barrier liquid crystal panel 100.

In the case of the second mode for 3D display as shown in FIG. 6, as described in FIG. 9, an alternating potential is applied to one first electrode 105-1a having an electrode width of (w/2) and two second electrodes 105-2a1 and 105-2a2 each having an electrode width of (w/4) arranged on the respective sides of the first electrode 105-1a (the same holds true for 105-1b, 105-2b1, and 105-2b2). Then, the slits 100Sa and 100Sb that shield the image light emitted from each pixel of the image display panel 10 are formed to have a slit width w (=w/4+w/2+w/4), as shown in the barrier liquid crystal layer 101 shown in FIG. 10. Further, the opening part that transmits the image light emitted from each pixel of the image display panel 10 is formed to have an opening width w (=w/4+w/2+w/4).

Meanwhile, in the case of the third mode for viewing angle control as shown in FIG. 8, as described with reference to FIG. 9, an alternating potential is applied to two second electrodes 105-2$a$1 and 105-2$a$2 each having an electrode width of (w/4) and two third electrodes 105-3$a$1 and 105-3$a$2 each having an electrode width of (w/4) adjacently arranged outside of the second electrodes 105-2$a$1 and 105-2$a$2, respectively (the same holds true for 105-2$b$1 and 105-2$b$2, and 105-3$b$1 and 105-3$b$2). Then, as shown in the barrier liquid crystal layer 101 as shown in FIG. 11, the slits 100S$a$, 100S$b$, 100S$c$, and 100S$d$ that shield the image light emitted from each pixel of the image display panel 10 are formed to have a slit width w/2 (=w/4+w/4). Further, the opening part that transmits the image light emitted from each pixel of the image display panel 10 is formed to have an opening width w/2 (=w/2).

Figure 12:
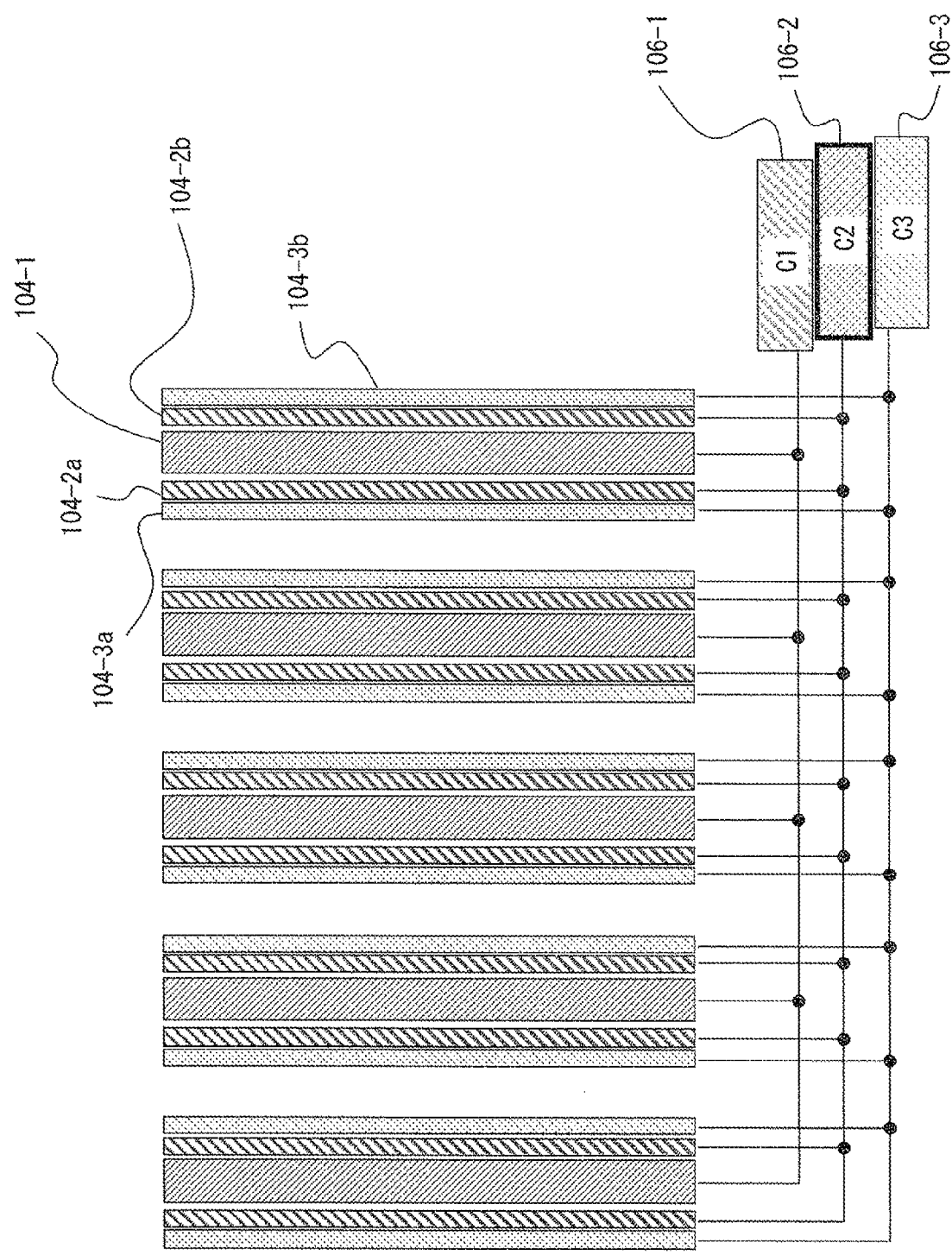
FIG. 12 is a schematic view showing an example of an electrode structure of a common-side transparent electrode for switching the slit width/slit pitch of the slits formed in the barrier liquid crystal layer of the barrier liquid crystal panel.

FIG. 10 and FIG. 11 each show an example of forming the common-side transparent electrode 104 as a single electrode pattern. However, the common-side transparent electrode 104 opposed to each set of the electrode group of the scan-side transparent electrode 105 in the barrier liquid crystal panel 100 may be formed as shown in a schematic view of FIG. 12. Specifically, by forming the common-side transparent electrode 104 to have the electrode pattern same to the electrode pattern of the scan-side transparent electrode 105 in the same direction shown in the schematic view in FIG. 9, it is possible to control the slit width w of the slits 100S to be formed with higher accuracy and to obtain preferable switching characteristics. FIG. 12 is a schematic view showing one example of the electrode structure of the common-side transparent electrode 104 for switching the slit width w/slit pitch p of the slits 100S formed in the barrier liquid crystal layer 101 of the barrier liquid crystal panel 100.

Specifically, as shown in FIG. 12, the common-side transparent electrode 104 formed in the same direction as the arrangement direction of the scan-side transparent electrode 105 is formed of electrode groups each including a set of five electrodes of one first electrode 104-1, two second electrodes 104-2$a$ and 104-2$b$ arranged on the respective sides of the first electrode 104-1, and two third electrodes 104-3$a$ and 104-3$b$ arranged outside of the two second electrodes 104-2$a$ and 104-2$b$, respectively, as is similar to the case of the scan-side transparent electrode 105 in FIG. 9. The first electrode, the second electrodes, and the third electrodes are connected to a first electrode drive circuit (C1) 106-1, a second electrode drive circuit (C2) 106-2, and a third electrode drive circuit (C3) 106-3 for common-side transparent electrode, respectively.

In FIG. 12, the electrode width of the first electrode 104-1 is substantially half ($\approx$w/2) of the slit width w (the arrangement interval w of pixels of the image display panel 10) of the slits 100S shown in FIG. 6, as is similar to the case of the scan-side transparent electrode 105 shown in FIG. 9. The electrode width of each of the two second electrodes 104-2$a$ and 104-2$b$ and the two third electrodes 104-3$a$ and 104-3$b$ is substantially ¼ ($\approx$w/4) of the slit width w (the arrangement interval w of pixels of the image display panel 10) of the slits 100S shown in FIG. 6. The opening width of a gap part where there is no electrode, i.e., an area between a set of an electrode group of five electrodes of the common-side transparent electrode and a set of the next electrode group, has substantially half ($\approx$w/2) the width of the slit width w (the arrangement interval w of pixels of the image display panel 10) of the slits 100S shown in FIG. 6. The reason for which the electrode width and the opening width are expressed using the term "substantially" compared to the slit width w (pixel arrangement interval w) is that, as is similar to the case of the scan-side transparent electrode 105 shown in FIG. 9, it is required to form the electrode patterns through an insulating film so as to prevent short-circuit between electrodes, and the electrode width and the opening width are somewhat different from the slit width w (pixel arrangement interval w) depending on the film forming accuracies of the insulating film and the electrode materials.

However, also for the common-side transparent electrode 104, it is desirable to definitely secure a minimum electrode width for forming the slits 100S having a constant slit width w as the barrier liquid crystal layer 101 of the barrier liquid crystal panel 100. Therefore, as is similar to the case of the scan-side transparent electrode 105, the first electrode 104-1 is arranged to substantially cover half (=w/2) the area of the slit width w. Each of the second electrodes 104-2$a$ and 104-2$b$ and the two third electrodes 104-3$a$ and 104-3$b$ is arranged to substantially cover one quarter (=w/4) of the area of the slit width w.

The electrode arrangement of the common-side transparent electrode 104 may be simplified compared to the configuration example shown in FIG. 12 in consideration of an electrical field applied to the barrier liquid crystal layer 101. For example, one first electrode 104-1, two second electrodes 104-2$a$ and 104-2$b$, and two third electrodes 104-3$a$ and 104-3$b$ may be integrally arranged as a solid pattern.

Figure 13:
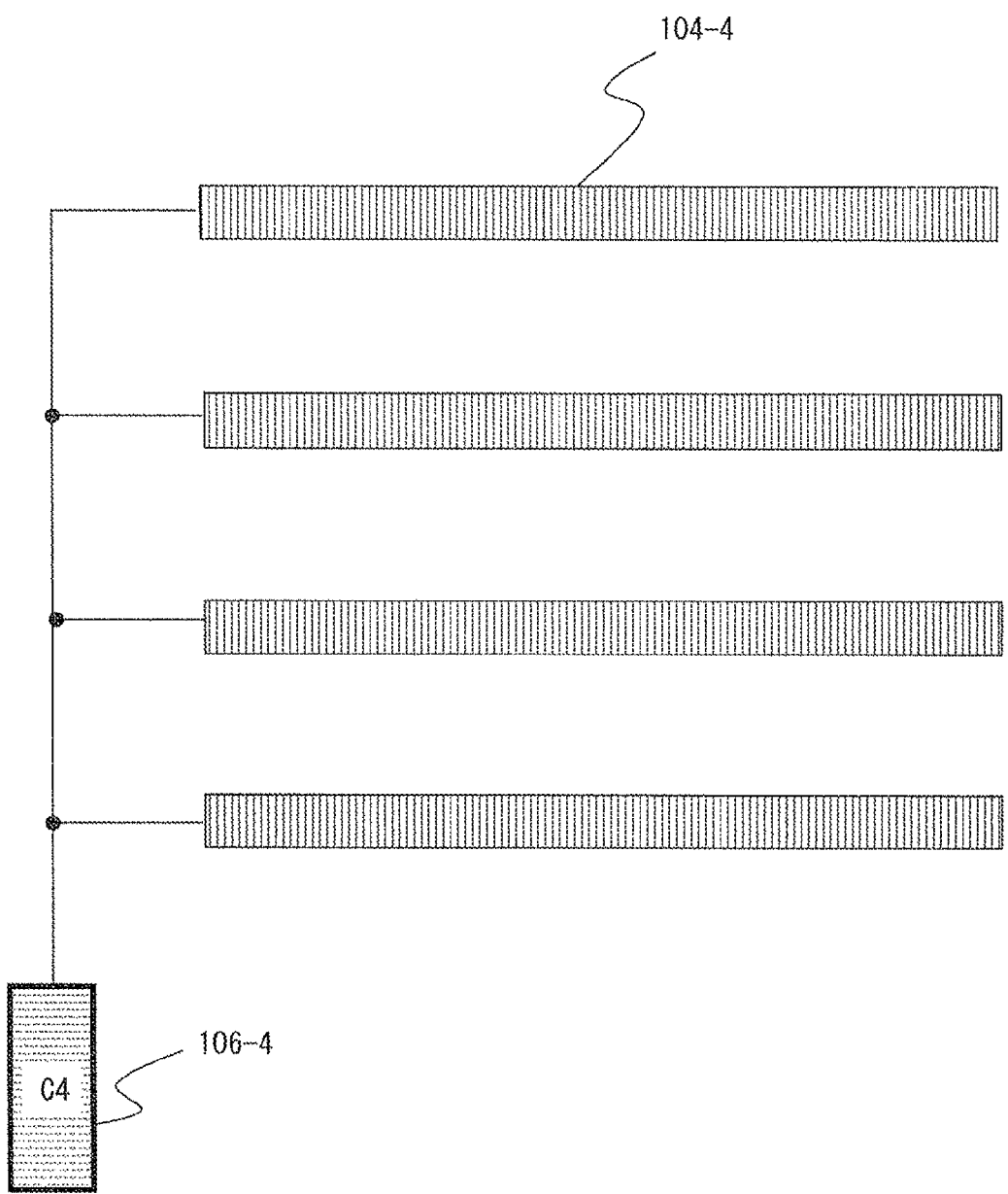
FIG. 13 is a schematic view showing an example different from FIG. 12, and shows an electrode structure of the common-side transparent electrode for switching the slit width/slit pitch of the slits formed in the barrier liquid crystal layer of the barrier liquid crystal panel.

Furthermore, as shown in a schematic view shown in FIG. 13, the common-side transparent electrode 104 may be formed as a single electrode pattern, and arranged in the direction perpendicular to the arrangement direction of the scan-side transparent electrode 105. FIG. 13 is a schematic view showing an example different from FIG. 12, and shows an electrode structure of the common-side transparent electrode 104 for switching the slit width w/slit pitch p of the slits 100S formed in the barrier liquid crystal layer 101 of the barrier liquid crystal panel 100.

In FIG. 13, each electrode set of the common-side transparent electrode 104 is formed only of one electrode of a single electrode 104-4 (electrode width is (w/2), for example), and the single electrode 104-4 is connected to a single electrode drive circuit (C4) 106-4. The single electrode 104-4 that forms the common-side transparent electrode 104 is arranged in the direction perpendicular to the arrangement direction of the scan-side transparent electrode 105, as stated above.

As shown in FIG. 9, the scan-side transparent electrode 105 is formed of electrode groups each including a set of five electrodes of one first electrode 105-1, two second electrodes 105-2$a$ and 105-2$b$ arranged on the respective sides of the first electrode 105-1, and two third electrodes 105-3$a$ and 105-3$b$ arranged outside of the two second electrodes 105-2$a$ and 105-2$b$, respectively. When the common-side transparent electrode 104 is formed of electrode groups each including a set of five electrodes of one first electrode 104-1, two second electrodes 104-2$a$ and 104-2$b$ arranged on the respective sides of the first electrode 104-1, and two third electrodes 104-3$a$ and 104-3$b$ arranged outside of the two second electrodes 104-2$a$ and 104-2$b$, respectively, as shown in FIG. 12, as is similar to the scan-side transparent electrode 105, the case of switching the mode to the second mode for 3D display and the case of switching the mode to the third mode for viewing angle control may be controlled as follows.

That is, in the case of switching the mode to the second mode for 3D display, both of the first electrode drive circuit (S1) 107-1 and the second electrode drive circuit (S2) 107-2 in the scan side are driven to apply an alternating potential to one first electrode 105-1 having an electrode width of (w/2) and the two second electrodes 105-2a and 105-2b each having an electrode width of (w/4) arranged on the respective sides of the first electrode 105-1. Meanwhile, each of the scan-side third electrode 105-3, the first electrode 104-1, the second electrode 104-2, and the third electrode 104-3 in the common side is controlled to be fixed to the common potential. Accordingly, it is possible to form the slits 100S having a slit width w required for 3D display at the desired positions more accurately compared to the case in which the common-side transparent electrode 104 is formed as a single electrode pattern.

Furthermore, in the case of switching the mode to the third mode for viewing angle control, both of the second electrode drive circuit (S2) 107-2 and the third electrode drive circuit (S3) 107-3 in the scan side are driven to apply an alternating potential to the two second electrodes 105-2a and 105-2b having an electrode width of (w/4) and the two third electrodes 105-3a and 105-3b having an electrode width of (w/4) arranged on outside of the second electrodes 105-2a and 105-2b, respectively. Meanwhile, each of the scan-side first electrode 105-1, the first electrode 104-1, the second electrode 104-2, and the third electrode 104-3 in the common side is controlled to be fixed to the common potential. Accordingly, it is possible to form the slits 100S having a slit width (w/2) required for viewing angle control at the desired positions more accurately.

When the mode is set to the first mode for normal 2D display in which neither 3D display nor viewing angle control is performed, all the electrodes of the first electrode 105-1, the second electrode 105-2, and the third electrode 105-3 in the scan side, and the first electrode 104-1, the second electrode 104-2, and the third electrode 104-3 in the common side may be controlled to be fixed to the common potential. Alternatively, in the case of normally white, all the electrodes may be set to the OFF state.

Further, the case of applying the configuration in which the common-side transparent electrode 104 formed of sets of electrodes, each set including a single electrode 104-4 is arranged in the direction perpendicular to the arrangement direction of the scan-side transparent electrode 105 as shown in FIG. 13 is similar to the case shown in FIG. 12. In this case, in any of the cases of the second mode for 3D display and the third mode for viewing angle control, the common-side single electrode 104-4 may be controlled to be fixed to the common potential.

Figure 14:
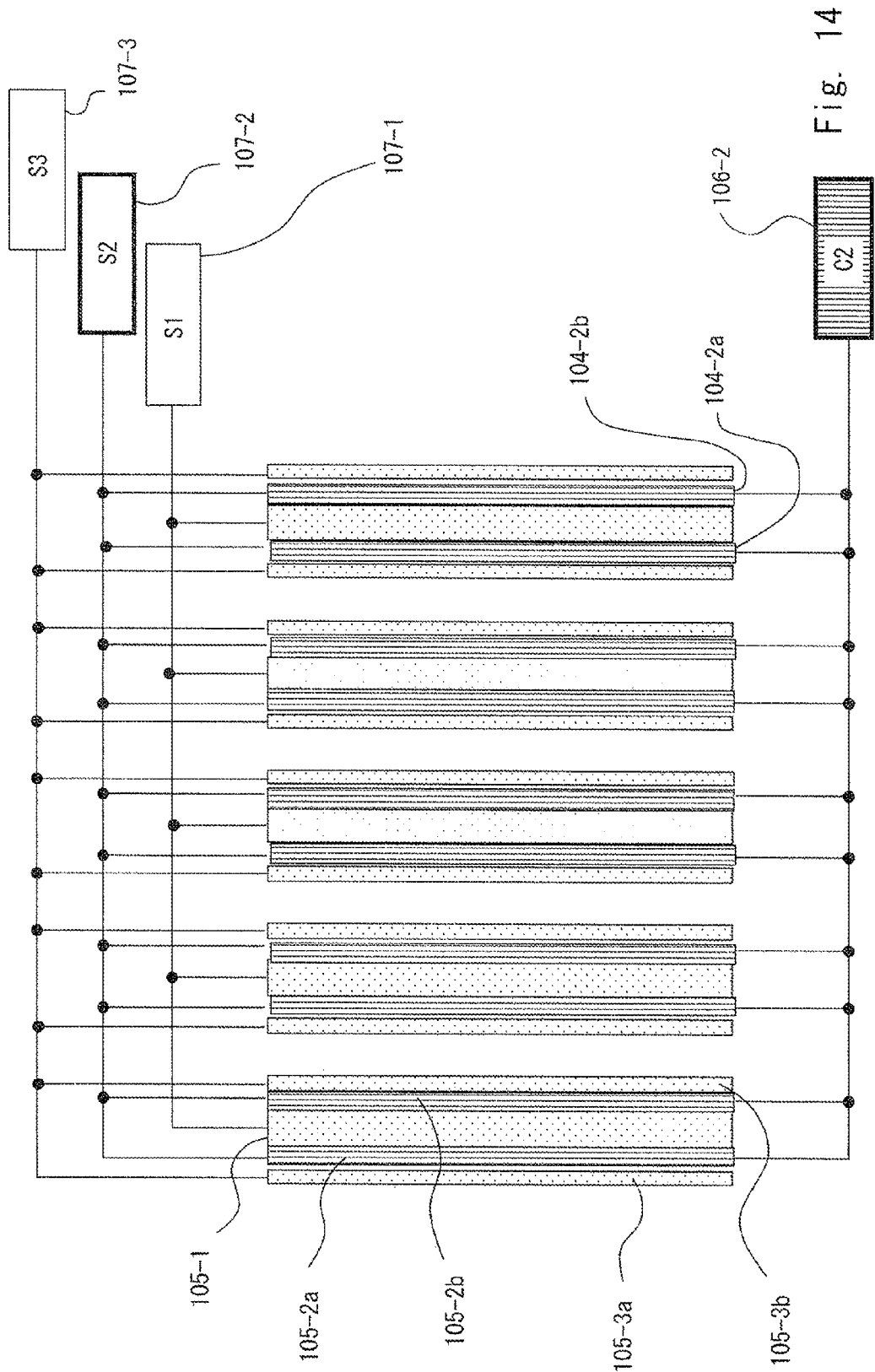
FIG. 14 is a schematic view showing an example different from FIGS. 12 and 13, and shows an electrode structure of the common-side transparent electrode for switching the slit width/slit pitch of the slits formed in the barrier liquid crystal layer of the barrier liquid crystal panel.

Further, instead of forming the common-side transparent electrode 104 of electrode groups each including a set of five electrodes of one first electrode 104-1, two second electrodes 104-2a and 104-2b arranged on the respective sides of the first electrode 104-1, and two third electrodes 104-3a and 104-3b arranged outside of the two second electrodes 104-2a and 104-2b, respectively, by applying the electrode structure which is the same to that of the opposing scan-side transparent electrode 105, as shown in FIG. 12, the common-side transparent electrode 104 may be formed only of the two second electrodes 104-2a and 104-2b arranged in the same direction as the arrangement direction of the scan-side transparent electrode 105, as shown in FIG. 14, in order to simplify the structure of the common-side transparent electrode 104. FIG. 14 is a schematic view showing an example different from FIG. 12 and FIG. 13, and shows an electrode structure of the common-side transparent electrode 104 for switching the slit width/slit pitch of the slits 100S formed in the barrier liquid crystal layer 101 of the barrier liquid crystal panel 100.

Specifically, each electrode set of the common-side transparent electrode 104 shown in FIG. 14 is formed only of the common-side two second electrodes 104-2a and 104-2b formed in the same position opposed to the two second electrodes 105-2a and 105-2b applied with the alternating potential in any of the second mode for 3D display and the third mode for viewing angle control in the scan-side transparent electrode 105. Accordingly, although it depends on the situations of an electrical field, by fixing the common-side second electrodes 104-2a and 104-2b to the common potential, it is possible to form the slits 100S substantially the same to those in FIGS. 10 and 11 more accurately than those in the single electrode pattern in any of the second mode for 3D display and the third mode for viewing angle control.

Figure 15:
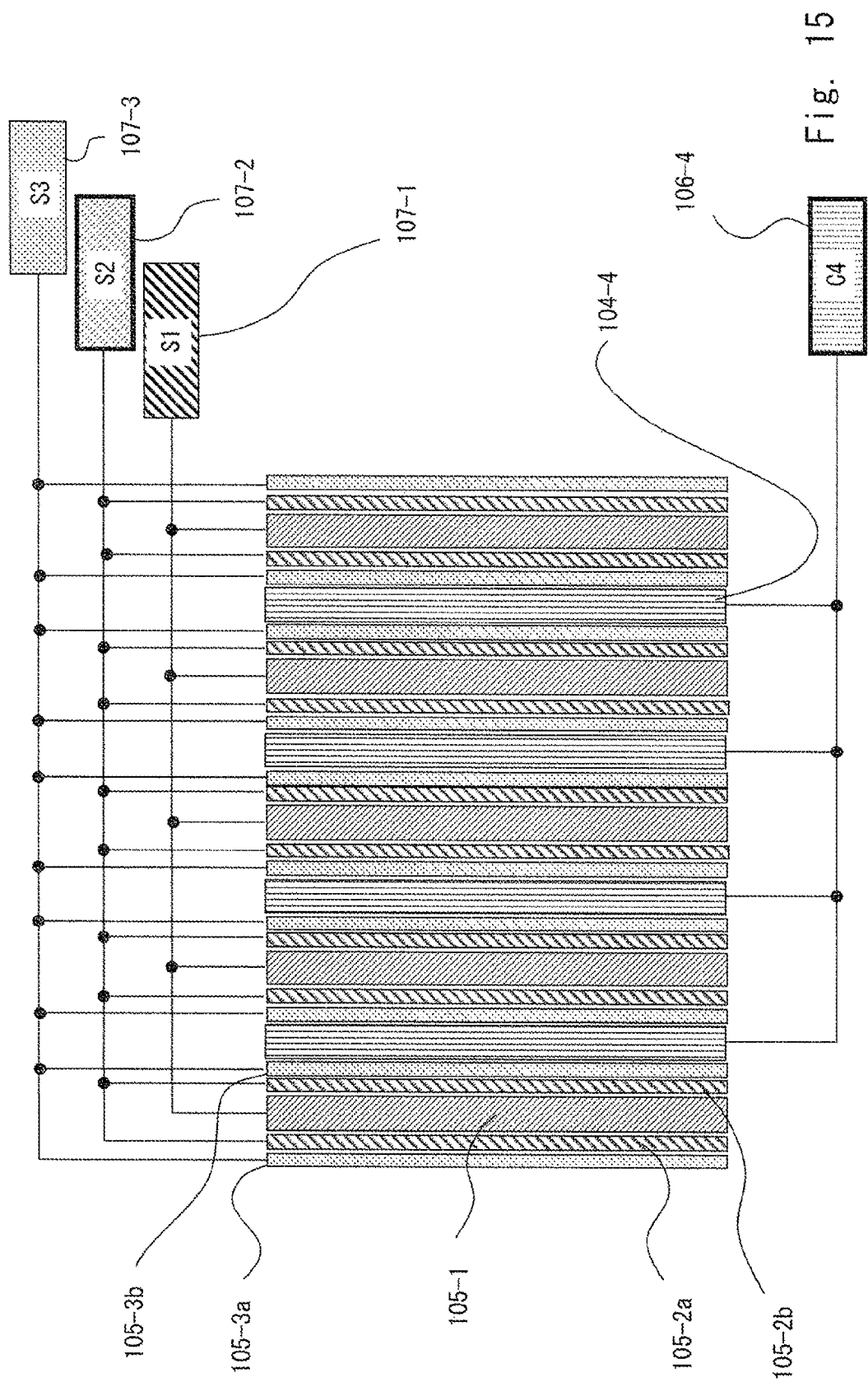
FIG. 15 is a schematic view showing another example of electrode structures of the scan-side transparent electrode and the common-side transparent electrode formed in the barrier liquid crystal layer of the barrier liquid crystal panel.
Figure 16:
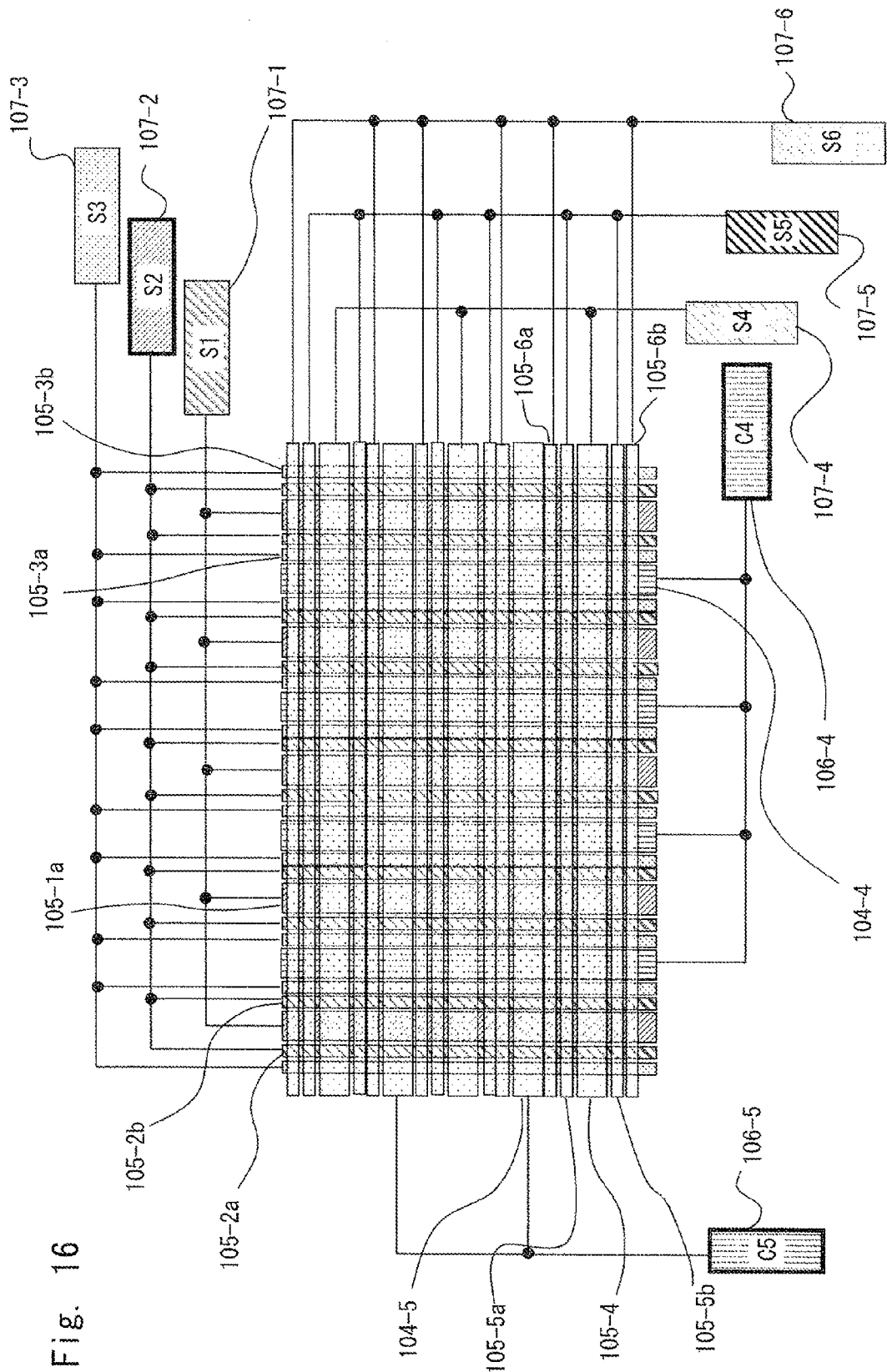
FIG. 16 is a schematic view showing an example of electrode structures of the scan-side transparent electrode and the common-side transparent electrode when the electrodes having the electrode structures shown in FIG. 15 are formed in the barrier liquid crystal layer of the barrier liquid crystal panel so that they are arranged to be perpendicular to each other.

Further, as a configuration example of the barrier liquid crystal panel 100, it is also possible to achieve switching control of vertical and horizontal directions of the image light from the image display panel 10 so as to be able to address with 3D display and switching of vertical and horizontal directions of the viewing angle. More specifically, as shown in FIG. 15, as a set of electrodes of the common-side transparent electrode 104, a first single electrode 104-4 having an electrode width substantially half (w/2) of the slit width w (i.e., the arrangement interval w of pixels of the image display panel 10) of the slits 100S in the 3D display is formed in each of the positions opposed to the gap parts between electrode sets of the scan-side transparent electrode 105 shown in FIG. 9 (i.e., outside of the scan-side third electrodes 105-3a and 105-3b). Further, in the similar way, a second single electrode 104-5 is formed in each of the gap parts between electrode sets of the scan-side transparent electrode 105. Then, both of them are arranged so as to be perpendicular to each other as shown in FIG. 16. Accordingly, it is possible to easily address with 3D display and switching of the vertical and horizontal directions of the viewing angle as well.

FIG. 15 is a schematic view showing another example of the electrode structures of the scan-side transparent electrode 105 and the common-side transparent electrode 104 formed in the barrier liquid crystal layer 101 of the barrier liquid crystal panel 100. Further, FIG. 16 is a schematic view showing an example of the electrode structures of the scan-side transparent electrode 105 and the common-side transparent electrode 104 when the electrodes having the structures shown in FIG. 15 are arranged to be perpendicular to each other in the barrier liquid crystal layer 101 of the barrier liquid crystal panel 100.

First, as shown in FIG. 15, as is similar to the case shown in FIG. 9, the scan-side transparent electrode 105 is formed of electrode groups each having a set of five electrodes of one first electrode 105-1 having an electrode width of (w/2), the two second electrodes 105-2a and 105-2b having an electrode width of (w/4) arranged on the respective sides of the first electrode 105-1, and the two third electrodes 105-3a and 105-3b having an electrode width of (w/4) arranged outside of the two second electrodes 105-2a and 105-2b, respectively. The first electrode 105-1, the second electrodes 105-2a and 105-2b, and the third electrodes 105-3a and 105-3b are connected to the first electrode drive circuit (S1) 107-1, the second electrode drive circuit (S2) 107-2, and the third electrode drive circuit (S3) 107-3 for scan-side transparent electrode, respectively.

Meanwhile, the common-side transparent electrode 104 is formed by arranging the first single electrode 104-4 having an electrode width of (w/2) in each of the positions opposed to the gap parts having a width (w/2) formed between the sets of the electrode groups of the scan-side transparent electrode 105. Then, the first single electrode 104-4 is connected to the first single electrode drive circuit (C4) 106-4 for common-side transparent electrode.

Next, in order to address with 3D display and switching of the vertical and horizontal directions of the viewing angle, electrode groups each including a set of five electrodes of one fourth electrode 105-4 having an electrode width of (w/2), two fifth electrodes 105-5a and 105-5b each having an electrode width of (w/4) arranged on the respective sides of the fourth electrode 105-4, and two sixth electrodes 105-6a and 105-6b each having an electrode width of (w/4) arranged outside of the two fifth electrodes 105-5a and 105-5b, respectively, having an electrode structure completely the same to that of FIG. 15 are further added as the scan-side transparent electrode 105 in the direction perpendicular to the arrangement direction of each electrode of the scan-side transparent electrode 105 and the common-side transparent electrode 104 shown in FIG. 15. Further, a second single electrode 104-5 having an electrode with of (w/2) is added as the common-side transparent electrode 104 to each of the positions corresponding to the gap parts having a width w/2) formed between the sets of the electrode groups each including the fourth electrode 105-4, the fifth electrodes 105-5a and 105-5b, and the sixth electrodes 105-6a and 105-6b of the scan-side transparent electrode 105 that are added. In this way, the electrode structure shown in FIG. 16 is formed.

As shown in FIG. 16, the fourth electrode 105-4, the fifth electrodes 105-5a and 105-5b, and the sixth electrodes 105-6a and 105-6b in the scan side added in the crossing positions are connected to a fourth electrode drive circuit (S4) 107-4, a fifth electrode drive circuit (S5) 107-5, and a sixth electrode drive circuit (S6) 107-6 for scan-side transparent electrode that are added, respectively. The common-side second single electrode 104-5 is connected to a second single electrode drive circuit (C5) 106-5 that is added.

In summary, in FIG. 16, the scan-side transparent electrode 105 is formed of electrode groups each including a set of five electrodes of one first electrode 105-1, two second electrodes 105-2a and 105-2b arranged on the respective sides of the first electrode 105-1, and two third electrodes 105-3a and 105-3b arranged outside of the two second electrodes 105-2a and 105-2b, respectively. Furthermore, in the direction perpendicular to the direction in which these electrode groups are arranged, electrode groups each including a set of five electrodes of one fourth electrode 105-4, two fifth electrodes 105-5a and 105-5b arranged on the respective sides of the fourth electrode 105-4, and two sixth electrodes 105-6a and 105-6b arranged outside of the two fifth electrodes 105-5a and 105-5b, respectively, are arranged. Further, the first single electrode 104-4 and the second single electrode 104-5 are arranged as the common-side transparent electrode 104 so as to be perpendicular to each other in each of the positions opposed to the gap parts between sets of the scan-side transparent electrode 105. According to these structures, it is possible to control switching of vertical and horizontal directions of the image light from the image display panel 10.

To be more specific, as shown in FIG. 16, by forming the scan-side transparent electrode 105 and the common-side transparent electrode 104 in the positions perpendicular to each other, and performing control to select the scan-side transparent electrode 105 and the common-side transparent electrode 104 that are in the arrangement direction specified based on the instruction of ON/OFF for switching vertical and horizontal directions, and applying an alternating potential to the scan-side electrode determined according to the instruction of the operation mode of the second mode for 3D display and the third mode for viewing angle control and controlling the rest of the electrodes to be fixed to the common potential, it is possible to appropriately switch control of vertical and horizontal directions of the image light from each pixel of the image display panel 10 according to the operation mode.

Regarding the process technique (manufacturing technique) for forming the image display unit described above in detail, the image display unit can be manufactured by simple application of any method known to those skilled in the art. Further, the process technique is not directly related to the present invention. Thus, description thereof will be omitted.

Description of Operations of Exemplary Embodiment

Next, with reference to a flowchart shown in FIG. 17, an example of an operation of switching operation modes in the image display unit including three operation modes of the first mode for 2D display which is the normal state, the second mode for 3D display, and the third mode for viewing angle control will further be described. FIG. 17 is a flowchart for describing an example of the operation of the image display unit including the three operation modes of the first mode for normal 2D display, the second mode for 3D display, and the third mode for viewing angle control as one example of the image display control method according to the present invention. Further, FIG. 18 is a diagram showing control contents of potentials in each step in FIG. 17.

FIG. 17 shows a flowchart of one example of a method of controlling switching of the voltage applied to the electrodes (each electrode of the scan-side transparent electrode 105, each electrode of the common-side transparent electrode 104) when an initial state in which the mode is set to the first mode for normal 2D display is made transition to each state of the second mode for 3D display and the third mode for viewing angle control in the 2D display. Further, the switching control method is distinguished according to the presence or absence of the function of switching vertical and horizontal directions. When the function of switching vertical and horizontal directions is included, the switching control method is further distinguished according to the instruction of ON/OFF of switching of vertical and horizontal directions.

As described above as a configuration example of the exemplary embodiment, various electrode patterns may be selected for the scan-side electrode group forming the scan-side transparent electrode 105 and the common-side electrode group forming the common-side transparent electrode 104. Thus, the flowchart shown in FIG. 17 shows a case in which they are formed of maximum number of electrodes as an exemplary embodiment.

Specifically, when the function of switching vertical and horizontal directions of the image light from the image display panel 10 is included, each set of the electrode group of the scan-side transparent electrode 105 is formed of the first electrode 105-1, the second electrode 105-2, the third electrode 105-3, the fourth electrode 105-4, the fifth electrode 105-5, and the sixth electrode 105-6, as shown in FIG.

16. The first electrode drive circuit (S1) 107-1, the second electrode drive circuit (S2) 107-2, the third electrode drive circuit (S3) 107-3, the fourth electrode drive circuit (S4) 107-4, the fifth electrode drive circuit (S5) 107-5, and the sixth electrode drive circuit (S6) 107-6 are provided as drive circuits to drive the respective electrodes. Meanwhile, when the function of switching vertical and horizontal directions is not included, each set of the electrode group of the scan-side transparent electrode 105 is formed of the first electrode 105-1, the second electrode 105-2, and the third electrode 105-3, as shown in FIG. 9. In FIG. 16, the first electrode drive circuit (S1) 107-1, the second electrode drive circuit (S2) 107-2, and the third electrode drive circuit (S3) 107-3 are provided as drive circuits to drive the respective electrodes.

On the other hand, when the function of switching vertical and horizontal directions of the image light from the image display panel 10 is included, each set of the electrode group of the common-side transparent electrode 104 is formed of the first single electrode 104-4 and the second single electrode 104-5, as shown in FIG. 16. The first single electrode drive circuit (C4) 106-4 and the second single electrode drive circuit (C5) 106-5 are provided as drive circuits to drive the respective electrodes. When the function of switching vertical and horizontal directions is not included, as shown in FIG. 12, each set of the electrode group of the common-side transparent electrode 104 is formed of the first electrode 104-1, the second electrode 104-2, and the third electrode 104-3. In FIG. 16, the first electrode drive circuit (C1) 106-1, the second electrode drive circuit (C2) 106-2, and the third electrode drive circuit (C3) 106-3 are provided as drive circuits to drive the respective electrodes.

In the flowchart shown in FIG. 17, when the mode is set to the first mode for 2D display which is the normal state in which neither 3D display nor viewing angle control is performed (status ST1), in the case of including the function of switching vertical and horizontal directions, the first electrode drive circuit (S1) 107-1, the second electrode drive circuit (S2) 107-2, the third electrode drive circuit (S3) 107-3, the fourth electrode drive circuit (S4) 107-4, the fifth electrode drive circuit (S5) 107-5, and the sixth electrode drive circuit (S6) 107-6 in the scan side, and the first single electrode drive circuit (C4) 106-4, and the second single electrode drive circuit (C5) 106-5 in the common side make all of the first electrode 105-1, the second electrode 105-2, the third electrode 105-3, the fourth electrode 105-4, the fifth electrode 105-5, and the sixth electrode 105-6 in the scan side, and the first single electrode 104-4 and the second single electrode 104-5 in the common side fixed to the common potential. Otherwise, in the case of normally white, all the scan-side electrodes and the common-side electrodes are controlled to be set to the OFF state (Step St1).

Further, when the mode is set to the first mode for 2D display and the function of switching vertical and horizontal directions is not included, the fourth electrode drive circuit (S4) 107-4, the fifth electrode drive circuit (S5) 107-5, and the sixth electrode drive circuit (S6) 107-6 in the scan side are not provided. Thus, the first electrode drive circuit (S1) 107-1, the second electrode drive circuit (S2) 107-2, and the third electrode drive circuit (S3) 107-3 in the scan side, and the first electrode drive circuit (C1) 106-1, the second electrode drive circuit (C2) 106-2, and the third electrode drive circuit (C3) 106-3 in the common side make all of the first electrode 105-1, the second electrode 105-2, and the third electrode 105-3 in the scan side, and the first electrode 104-1, the second electrode 104-2, and the third electrode 104-3 in the common side fixed to the common potential. Otherwise, in the case of normally white, all the scan-side electrodes and the common-side electrodes are set to the OFF state (Step St1).

Further, when the first mode for normal 2D display is switched to the second mode for 3D display (status ST2), the presence or absence of the function of switching vertical and horizontal directions is checked. When the function of switching vertical and horizontal directions is not included (Step St2), the fourth electrode drive circuit (S4) 107-4, the fifth electrode drive circuit (S5) 107-5, and the sixth electrode drive circuit (S6) 107-6 in the scan side are not provided. Therefore, the first electrode drive circuit (S1) 107-1 and the second electrode drive circuit (S2) 107-2 in the scan side are driven to apply an alternating potential to the first electrode 105-1 and the second electrode 105-2 in the scan side. Meanwhile, the scan-side third electrode 105-3, and the first electrode 104-1, the second electrode 104-2, and the third electrode 104-3 in the common side are controlled to be fixed to the common potential by the scan-side third electrode drive circuit (S3) 107-3, and the first electrode drive circuit (C1) 106-1, the second electrode drive circuit (C2) 106-2, and the third electrode drive circuit (C3) 106-3 in the common side (Step St3, FIG. 18).

Accordingly, as shown in FIG. 1, the slit width of the slits 100S that shield transmission of the image light for 3D in the barrier liquid crystal panel 100 is formed to have the same width as the pixel arrangement interval w. The opening width that transmits the image light for 3D in the barrier liquid crystal layer 101 of the barrier liquid crystal panel 100 is also formed to have the same width as the pixel arrangement interval w, and the state is switched to the state for 3D display.

Meanwhile, when the function of switching vertical and horizontal directions is included (Step St4), the instruction of ON/OFF of the function of switching vertical and horizontal directions is further checked. When the instruction of the function of switching vertical and horizontal directions is OFF (Step St5), the first electrode drive circuit (S1) 107-1 and the second electrode drive circuit (S2) 107-2 in the scan side are driven to apply an alternating potential to the first electrode 105-1 and the second electrode 105-2 in the scan side. Meanwhile, the third electrode 105-3, the fourth electrode 105-4, the fifth electrode 105-5, and the sixth electrode 105-6 in the scan side, and the first single electrode 104-4 and the second single electrode 104-5 in the common side are controlled to be fixed to the common potential by the third electrode drive circuit (S3) 107-3, the fourth electrode drive circuit (S4) 107-4, the fifth electrode drive circuit (S5) 107-5, and the sixth electrode drive circuit (S6) 107-6 in the scan side, and the first single electrode drive circuit (C4) 106-4 and the second single electrode drive circuit (C5) 106-5 in the common side (Step St6, FIG. 18).

Accordingly, the slit width of the slits 100S that shield transmission of the image light for 3D in the barrier liquid crystal panel 100 is formed to have the same width as the pixel arrangement interval w in the horizontal direction of the image display unit, for example. The opening width that transmits the image light for 3D in the barrier liquid crystal layer 101 of the barrier liquid crystal panel 100 is also formed to have the same width as the pixel arrangement interval w, and the state is switched to the state for 3D display.

Further, when the instruction of the function of switching vertical and horizontal directions is ON (Step St7), in order to switch control of the vertical and horizontal directions of the image light from the image display panel 10, the fourth electrode drive circuit (S4) 107-4 and the fifth electrode drive circuit (S5) 107-5 in the scan side are driven to apply an alternating potential to the fourth electrode 105-4 and the fifth electrode 105-5 in the scan side. Meanwhile, the first electrode 105-1, the second electrode 105-2, the third electrode 105-3, and the sixth electrode 105-6 in the scan side, and the first single electrode 104-4 and the second single electrode 104-5 in the common side are controlled to be fixed to the common potential by the first electrode drive circuit (S1) 107-1, the second electrode drive circuit (S2) 107-2, the third electrode drive circuit (S3) 107-3, and the sixth electrode drive circuit (S6) 107-6 in the scan side, and the first single electrode drive circuit (C4) 106-4 and the second single electrode drive circuit (C5) 106-5 in the common side (Step St8, FIG. 18).

Accordingly, the slit width of the slits 100S that shield transmission of the image light for 3D in the barrier liquid crystal panel 100 is formed to have the same width as the pixel arrangement interval w in the vertical direction of the image display unit, for example. The opening width that transmits the image light for 3D in the barrier liquid crystal layer 101 of the barrier liquid crystal panel 100 is also formed to have the same width as the pixel arrangement interval w, and the state is switched to the state for 3D display.

Further, when the first mode for normal 2D display is switched to the third mode for viewing angle control (status ST3), as is similar to switching to the second mode for 3D display, the presence or absence of the function of switching vertical and horizontal directions is checked. When there is no function of switching vertical and horizontal directions (Step St9), the fourth electrode drive circuit (S4) 107-4, the fifth electrode drive circuit (S5) 107-5, and the sixth electrode drive circuit (S6) 107-6 in the scan side are not included. Thus, the second electrode drive circuit (S2) 107-2 and the third electrode drive circuit (S3) 107-3 in the scan side are driven to apply an alternating potential to the second electrode 105-2 and the third electrode 105-3 in the scan side. Meanwhile, the scan-side first electrode 105-1, and the first electrode 104-1, the second electrode 104-2, and the third electrode 104-3 in the common side are controlled to be fixed to the common potential by the scan-side first electrode drive circuit (S1) 107-1, and the first electrode drive circuit (C1) 106-1, the second electrode drive circuit (C2) 106-2, and the third electrode drive circuit (C3) 106-3 in the common side (Step St10, FIG. 18).

Accordingly, as shown in FIG. 2, the slit width of the slits 100S that shield transmission of the image light for 2D in the barrier liquid crystal panel 100 is formed to be half the width (w/2) of the pixel arrangement interval w. The opening width that transmits the image light for 2D in the barrier liquid crystal layer 101 of the barrier liquid crystal panel 100 is also formed to be half the width (w/2) of the pixel arrangement interval w, and the state is switched to the state for viewing angle control in which the viewing angle is further limited compared to the first mode.

Meanwhile, when the function of switching vertical and horizontal directions is included (Step St11), as is similar to the case of switching to the second mode for 3D display, the instruction of ON/OFF of the function of switching vertical and horizontal directions is further checked. When the instruction of the function of switching vertical and horizontal directions is OFF (Step St12), the second electrode drive circuit (S2) 107-2 and the third electrode drive circuit (S3) 107-3 in the scan side are driven to apply an alternating potential to the second electrode 105-2 and the third electrode 105-3 in the scan side. Meanwhile, the first electrode 105-1, the fourth electrode 105-4, the fifth electrode 105-5, and the sixth electrode 105-6 in the scan side, and the first single electrode 104-4 and the second single electrode 104-5 in the common side are controlled to be fixed to the common potential by the first electrode drive circuit (S1) 107-1, the fourth electrode drive circuit (S4) 107-4, the fifth electrode drive circuit (S5) 107-5, and the sixth electrode drive circuit (S6) 107-6 in the scan side, and the first single electrode drive circuit (C4) 106-4 and the second single electrode drive circuit (C5) 106-5 in the common side (Step St13, FIG. 18).

Accordingly, the slit width of the slits 100S that shield transmission of the image light for 2D in the barrier liquid crystal panel 100 is formed to be half the width (w/2) of the pixel arrangement interval w in the horizontal direction of the image display unit, for example. The opening width that transmits the image light for 2D in the barrier liquid crystal layer 101 of the barrier liquid crystal panel 100 is also formed to be half the width (w/2) of the pixel arrangement interval w, and the state is switched to the state for viewing angle control in which the viewing angle is further limited compared to the first mode.

Meanwhile, when the instruction of the function of switching vertical and horizontal directions is ON (Step St14), in order to switch control of the vertical and horizontal directions of the image light from the image display panel 10, the fifth electrode drive circuit (S5) 107-5 and the sixth electrode drive circuit (S6) 107-6 in the scan side are driven to apply an alternating potential to the fifth electrode 105-5 and the sixth electrode 105-6 in the scan side. Meanwhile, the first electrode 105-1, the second electrode 105-2, the third electrode 105-3, and the fourth electrode 105-4 in the scan side, and the first single electrode 104-4 and the second single electrode 104-5 in the common side are fixed to the common potential by the first electrode drive circuit (S1) 107-1, the second electrode drive circuit (S2) 107-2, the third electrode drive circuit (S3) 107-3, and the fourth electrode drive circuit (S4) 107-4 in the scan side, and the first single electrode drive circuit (C4) 106-4 and the second single electrode drive circuit (C5) 106-5 in the common side (Step St15, FIG. 18).

Accordingly, the slit width of the slits 100S that shield transmission of the image light for 2D in the barrier liquid crystal panel 100 is formed to be half the width (w/2) of the pixel arrangement interval w in the vertical direction of the image display unit, for example. The opening width that transmits the image light for 2D in the barrier liquid crystal layer 101 of the barrier liquid crystal panel 100 is also formed to be half the width (w/2) of the pixel arrangement interval w, and the state is switched to the state for viewing angle control in which the viewing angle is further limited compared to the first mode.

Description of Effects of Exemplary Embodiment

As described above in detail, the exemplary embodiment achieves the effects as follows.

The first effect is as follows. The electrode structures of the scan-side transparent electrode 105 and the common-side transparent electrode 104 formed in the barrier liquid crystal panel 100 are such that one or a plurality of electrodes are formed as one set. Further, the electrode group of each set is arranged so as to correspond to the position of the center of each of the pixels of the image display panel 10, and the method of controlling the electrode group of each set is differentiated according to the operation mode. Accordingly, it is possible to easily switch the mode to any one of the three operation modes of the first mode for 2D display, the second mode for 3D display, and the third mode for viewing angle control.

The second effect is as follows. For example, when the exemplary embodiment is applied as the image display unit of the parallax barrier system as described in the aforementioned exemplary embodiment, the barrier liquid crystal panel 100 is added to perform switching between 2D and 3D. Although this increases the thickness, there is no need to increase further thickness to further add the viewing angle control function, and the structural risks such as strength as the image display module or the image display apparatus can also be reduced.

The third effect is as follows. For example, when the exemplary embodiment is applied as the image display unit of the parallax barrier system as described in the aforementioned exemplary embodiment, it is possible to apply the manufacturing process itself of the parallax barrier panel, i.e., the barrier liquid crystal panel without greatly changing the conventional technique to add the function for 3D display and the function for viewing angle control to the normal function for 2D display.

The fourth effect is as follows. That is, also in a front view when the 2D display or the viewing angle control is achieved, it is possible to achieve the brightness equal to that in the 3D display depending on the conditions of forming the slits 100S formed in the barrier liquid crystal panel 100.

The configurations of the preferred exemplary embodiment of the present invention have been described above. However, it should be noted that the exemplary embodiment is merely an example of the present invention and is not intended to limit the present invention. Those skilled in the art would easily understand that various modifications can be made according to the specific application without departing from the spirit of the present invention.

While the present invention has been described as a hardware configuration in the exemplary embodiment stated above, the present invention is not limited to this. The present invention may achieve any desired processing by causing a central processing unit (CPU) to execute a computer program. Further, the aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present invention has been described above with reference to the exemplary embodiment, the present invention is not limited to the above exemplary embodiment. The configurations and details of the present invention can be modified in various manners which can be understood by those skilled in the art within the scope of the invention.

This application is based upon and claims the benefit of priority from Japanese Patent Application No. 2011-048131, filed on Mar. 4, 2011, the disclosure of which is incorporated herein in its entirety by reference.

REFERENCE SIGNS LIST

10 IMAGE DISPLAY PANEL
10A PIXEL
10B PIXEL FOR BOTH EYES
10L PIXEL FOR LEFT EYE
10R PIXEL FOR RIGHT EYE
11 LIQUID CRYSTAL LAYER FOR DISPLAY
12, 12A, 12B PANEL SUBSTRATE
100 BARRIER LIQUID CRYSTAL PANEL (PARALLAX BARRIER PANEL)
100S, 100SA, 100SB, 100SC, 100SD SLIT
101 BARRIER LIQUID CRYSTAL LAYER
102, 102A, 102B PANEL SUBSTRATE
103, 103A, 103B POLARIZER
104 COMMON-SIDE TRANSPARENT ELECTRODE
104-1 FIRST ELECTRODE (COMMON-SIDE TRANSPARENT ELECTRODE)
104-2, 104-2A, 104-2B SECOND ELECTRODE (COMMON-SIDE TRANSPARENT ELECTRODE)
104-3, 104-3A, 104-3B THIRD ELECTRODE (COMMON-SIDE TRANSPARENT ELECTRODE)
104-4 SINGLE ELECTRODE (OR FIRST SINGLE ELECTRODE) (COMMON-SIDE TRANSPARENT ELECTRODE)
104-5 SECOND SINGLE ELECTRODE (COMMON-SIDE TRANSPARENT ELECTRODE)
105, 105A, 105B, 105C SCAN-SIDE TRANSPARENT ELECTRODE
105-1 FIRST ELECTRODE (SCAN-SIDE TRANSPARENT ELECTRODE)
105-2, 105-2A, 105-2B, 105-2A1, 105-2A2, 105-2B1, 105-2B2 SECOND ELECTRODE (SCAN-SIDE TRANSPARENT ELECTRODE)
105-3, 105-3A, 105-3B, 105-3A1, 105-3A2, 105-3B1, 105-3B2 THIRD ELECTRODE (SCAN-SIDE TRANSPARENT ELECTRODE)
105-4 FOURTH ELECTRODE (SCAN-SIDE TRANSPARENT ELECTRODE)
105-5, 105-5A, 105-5B FIFTH ELECTRODE (SCAN-SIDE TRANSPARENT ELECTRODE)
105-6, 105-6A, 105-6B SIXTH ELECTRODE (SCAN-SIDE TRANSPARENT ELECTRODE)
106-1 FIRST ELECTRODE DRIVE CIRCUIT (C1) (FOR COMMON-SIDE TRANSPARENT ELECTRODE)
106-2 SECOND ELECTRODE DRIVE CIRCUIT (C2) (FOR COMMON-SIDE TRANSPARENT ELECTRODE)
106-3 THIRD ELECTRODE DRIVE CIRCUIT (C3) (FOR COMMON-SIDE TRANSPARENT ELECTRODE)
106-4 SINGLE ELECTRODE DRIVE CIRCUIT (OR FIRST SINGLE ELECTRODE DRIVE CIRCUIT) (C4) (FOR COMMON-SIDE TRANSPARENT ELECTRODE)
106-5 SECOND SINGLE ELECTRODE DRIVE CIRCUIT (C5) (FOR COMMON-SIDE TRANSPARENT ELECTRODE)
107-1 FIRST ELECTRODE DRIVE CIRCUIT (S1) (FOR SCAN-SIDE TRANSPARENT ELECTRODE)
107-2 SECOND ELECTRODE DRIVE CIRCUIT (S2) (FOR SCAN-SIDE TRANSPARENT ELECTRODE)

107-3 THIRD ELECTRODE DRIVE CIRCUIT (S3) (FOR SCAN-SIDE TRANSPARENT ELECTRODE)
107-4 FOURTH ELECTRODE DRIVE CIRCUIT (S4) (FOR SCAN-SIDE TRANSPARENT ELECTRODE)
107-5 FIFTH ELECTRODE DRIVE CIRCUIT (S5) (FOR SCAN-SIDE TRANSPARENT ELECTRODE)
107-6 SIXTH ELECTRODE DRIVE CIRCUIT (S6) (FOR SCAN-SIDE TRANSPARENT ELECTRODE)
201 RIGHT EYE
202 LEFT EYE
D DISTANCE BETWEEN PIXEL AND SLIT
P SLIT PITCH
P' SLIT PITCH
T SLIT THICKNESS
W SLIT WIDTH
W' SLIT WIDTH
Θ ANGLE OF LIGHT FLUX (VIEWING CONE)
Θ' ANGLE OF LIGHT FLUX (VIEWING CONE)

The invention claimed is:

1. An image display unit at least comprising:
an image display panel that forms pixels to display an image; and
a barrier liquid crystal panel that is arranged above the image display panel and forms slits that serve as barriers to shield image light from the pixels of the image display panel; and
first, second and third electrode drive circuits,
wherein the barrier liquid crystal panel includes a scan-side transparent electrode and a common-side transparent electrode,
wherein the scan-side transparent electrode is formed of electrode groups, each electrode group including a set of five electrodes comprised of one first electrode having an electrode width substantially half of the arrangement intervals of the pixels, two second electrodes arranged on the respective sides of the first electrode, the second electrodes each having an electrode width substantially one fourth of the arrangement intervals of the pixels, and two third electrodes arranged outside of the respective two second electrodes, the third electrodes each having an electrode width substantially one fourth of the arrangement intervals of the pixels, and a gap part is provided between sets of the electrode groups, the gap part having a width substantially half of the arrangement intervals of the pixels,
wherein the common-side transparent electrode is fixed to a common potential,
wherein the first electrode drive circuit that is connected to the first electrode,
wherein the second electrode drive circuit that is connected to the second electrode,
wherein the third electrode drive circuit that is connected to the third electrode,
wherein in a first mode as a two dimension (2D) display function that emits image light for 2D display from the pixels of the image display panel, the first electrode drive circuit fixes the first electrode to the common potential, the second electrode drive circuit fixes the second electrodes to the common potential, and the third electrode drive circuit fixes the third electrodes to the common potential,
wherein in a second mode as a three dimension (3D) display function that emits image light for 3D display from each of pixels for left eye and pixels for right eye of the pixels of the image display panel, the first electrode drive circuit applies an alternating potential to the first electrode, the second electrode drive circuit applies the alternating potential to the second electrodes, and the third electrode drive circuit fixes the third electrodes to the common potential,
wherein in a third mode as a viewing angle control function that controls a viewing angle of the image light from the pixels of the image display panel, the second electrode drive circuit applies the alternating potential to the second electrodes, the third electrode drive circuit applies the alternating potential to the third electrodes, and the first electrode drive circuit fixes the first electrode to the common potential, and
wherein the barrier liquid crystal panel appropriately controls the applied potential according to an operation mode that is specified to change a slit width and a slit pitch of the slits formed in the barrier liquid crystal panel, thereby switching one of the first to third modes to another one of the first to third modes.

2. The image display unit according to claim 1, wherein:
in the first mode, the first electrode, the second electrodes, the third electrodes and the common-side transparent electrode are either fixed to a common potential or set to an OFF state, thereby emitting the image light for two dimension (2D) display from the pixels of the image display panel from the barrier liquid crystal panel without forming the slits in the barrier liquid crystal panel,
in the second mode, by applying an alternating potential to the first electrode and the second electrodes, and fixing the third electrodes and the common-side transparent electrode to a common potential, the slits having a slit width and a slit pitch equal to the arrangement intervals of the pixels are formed in the barrier liquid crystal panel so that side edges of the slits are arranged in positions opposed to centers of the pixels, to emit the image light for three dimension (3D) display from each of pixels for left eye and pixels for right eye of the pixels of the image display panel to each direction from the barrier liquid crystal panel, and
in the third mode, by applying an alternating potential to the second electrodes and the third electrodes, and fixing the first electrode and the common-side transparent electrode to a common potential, the slits having a slit width and a slit pitch narrower than the arrangement intervals of the pixels are formed in the barrier liquid crystal panel, and the viewing angle of the image light from the pixels of the image display panel is limited to a range specified for viewing angle control to emit the image light from the barrier liquid crystal panel.

3. The image display unit according to claim 1, wherein the scan-side transparent electrode is formed in any one of a horizontal direction and a vertical direction or formed so as to be perpendicular to both of the horizontal direction and the vertical direction, and the common-side transparent electrode is formed in a direction same to a direction in which the scan-side transparent electrode is arranged or in a direction perpendicular to the direction in which the scan-side transparent electrode is arranged, or formed so as to be perpendicular to both of the horizontal direction and the vertical direction.

4. The image display unit according to claim 2, wherein the scan-side transparent electrode is formed in any one of a horizontal direction and a vertical direction or formed so as to be perpendicular to both of the horizontal direction and the vertical direction, and the common-side transparent electrode is formed in a direction same to a direction in which the scan-side transparent electrode is arranged or in a direction perpendicular to the direction in which the scan-side transparent electrode is arranged, or formed so as to be perpendicular to both of the horizontal direction and the vertical direction.

* * * * *